(12) United States Patent
Yun et al.

(10) Patent No.: US 9,073,493 B1
(45) Date of Patent: Jul. 7, 2015

(54) METHOD AND APPARATUS FOR ADJUSTING VIEW MIRROR IN VEHICLE

(71) Applicant: QUALCOMM Incorporated, San Diego, CA (US)

(72) Inventors: Sungrack Yun, Seoul (KR); Kang Kim, Seoul (KR); Seungwoo Yoo, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/249,755

(22) Filed: Apr. 10, 2014

(51) Int. Cl.
*B60R 1/12* (2006.01)
*G02B 7/182* (2006.01)
*G02B 5/08* (2006.01)

(52) U.S. Cl.
CPC ............... *B60R 1/12* (2013.01); *G02B 7/1827* (2013.01); *B60R 2001/1253* (2013.01)

(58) Field of Classification Search
CPC .......... B60R 1/12; G02B 7/1827; G02B 5/08; G06F 19/00
USPC ............................... 701/49, 36; 359/843, 872
See application file for complete search history.

(56) References Cited

U.S. PATENT DOCUMENTS

| | | | |
|---|---|---|---|
| 5,471,146 A | 11/1995 | Krayeski et al. | |
| 7,512,386 B2 | 3/2009 | Kalajo et al. | |
| 8,167,444 B2 * | 5/2012 | Lee et al. | 359/843 |
| 8,219,045 B2 | 7/2012 | Stralko | |
| 2003/0114182 A1 | 6/2003 | Chan et al. | |
| 2006/0155444 A1 * | 7/2006 | Lee et al. | 701/49 |
| 2013/0178175 A1 | 7/2013 | Kato | |

* cited by examiner

*Primary Examiner* — Tan Q Nguyen
(74) *Attorney, Agent, or Firm* — Toler Law Group, PC

(57) ABSTRACT

According to an aspect of the present disclosure, a method for adjusting a view mirror in a vehicle is disclosed. The method includes obtaining a first angle of the view mirror, capturing an image of a head of a driver, determining, from the captured image, a viewing distance and a perpendicular distance between a location in the head and the view mirror, calculating a view angle based on the viewing distance and the perpendicular distance, wherein the view angle is an angle between a direction orthogonal to the view mirror and a view direction associated with the location in the head and the view mirror, determining a second angle of the view mirror based on the first angle and the view angle, and adjusting the view mirror from the first angle to the second angle.

30 Claims, 13 Drawing Sheets

METHOD AND APPARATUS FOR ADJUSTING VIEW MIRROR IN VEHICLE

TECHNICAL FIELD

The present disclosure relates generally to adjusting a view mirror in a vehicle, and more specifically, to adjusting a view mirror in a vehicle based on a captured image of a driver.

BACKGROUND

Conventional vehicles are typically equipped with a plurality of view mirrors to provide drivers with views around the vehicles. For example, conventional vehicles are generally equipped with a rear-view mirror and two side-view mirrors. The rear-view mirror provides a view of the rear of a vehicle while the side-view mirrors provide a view of the sides (e.g., left and right sides) of the vehicle. Such mirrors allow a driver to see views of the rear and sides of the vehicle without substantially turning his or her head.

In conventional vehicles, a driver may manually adjust the view mirrors to a desired position according to the driver's preference. Some vehicles are also equipped with a power mirror function to allow a driver to electronically adjust the position of side-view mirrors. In these vehicles, the driver may operate a button or a knob to electronically select and adjust the position of a side-view mirror.

While operating a vehicle, however, the driver's posture or position in the driver's seat may change over time. For example, a driver's posture or position in the seat may change due to a movement of the driver such as bending or moving his or her head, neck, back, hip, or torso in the seat. Additionally, the driver may adjust the position of the driver's seat in the course of driving the vehicle. Thus, the view mirrors as initially set by the driver may no longer provide an optimum view of the rear and/or sides of the vehicle. Although the mirrors may be readjusted, it may be inconvenient or unsafe for the driver to adjust the mirrors while operating the vehicle.

SUMMARY

The present disclosure relates to adjusting a view mirror in a vehicle based on a captured image of a driver.

According to one aspect of the present disclosure, a method for adjusting a view mirror in a vehicle is disclosed. In this method, a first angle of the view mirror is obtained. An image of a head of a driver is captured. From the captured image, a viewing distance and a perpendicular distance between a location in the head and the view mirror are determined. Based on the viewing distance and the perpendicular distance, a view angle between a direction orthogonal to the view mirror and a view direction associated with the location in the head and the view mirror is calculated. Based on the first angle and the view angle, a second angle of the view mirror is determined. Then, the view mirror is adjusted from the first angle to the second angle. This disclosure also describes apparatus, a device, a system, a combination of means, and a computer-readable medium relating to this method.

According to another aspect of the present disclosure, a method for adjusting a view mirror in a vehicle is disclosed. In this method, a first angle of the view mirror is obtained. An image of a head of a driver is captured. From the captured image, a perpendicular direction orthogonal to the view mirror and a view direction associated with a location in the head and the view mirror are determined. Based on the view direction and the perpendicular direction, a view angle is calculated. Based on the first angle and the view angle, a second angle of the view mirror is determined. Then, the view mirror is adjusted from the first angle to the second angle. This disclosure also describes apparatus, a device, a system, a combination of means, and a computer-readable medium relating to this method According to still another aspect of the present disclosure, an electronic device in a vehicle for adjusting a view mirror in the vehicle is disclosed. The electronic device includes an image sensor unit, an object detection unit, an adjustment angle determination unit, and a mirror control unit. The image sensor unit is configured to capture an image of a head of a driver. The object detection unit is configured to determine, from the captured image, a viewing location in the head. The adjustment angle determination unit is configured to obtain a first angle of the view mirror, determine, from the captured image, a viewing distance and a perpendicular distance between the view mirror and the viewing location, calculate a view angle based on the viewing distance and the perpendicular distance, and determine a second angle of the view mirror based on the first angle and the view angle, wherein the view angle is an angle between a direction orthogonal to the view mirror and a view direction associated with the viewing location and the view mirror. The mirror control unit is configured to adjust the view mirror from the first angle to the second angle.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
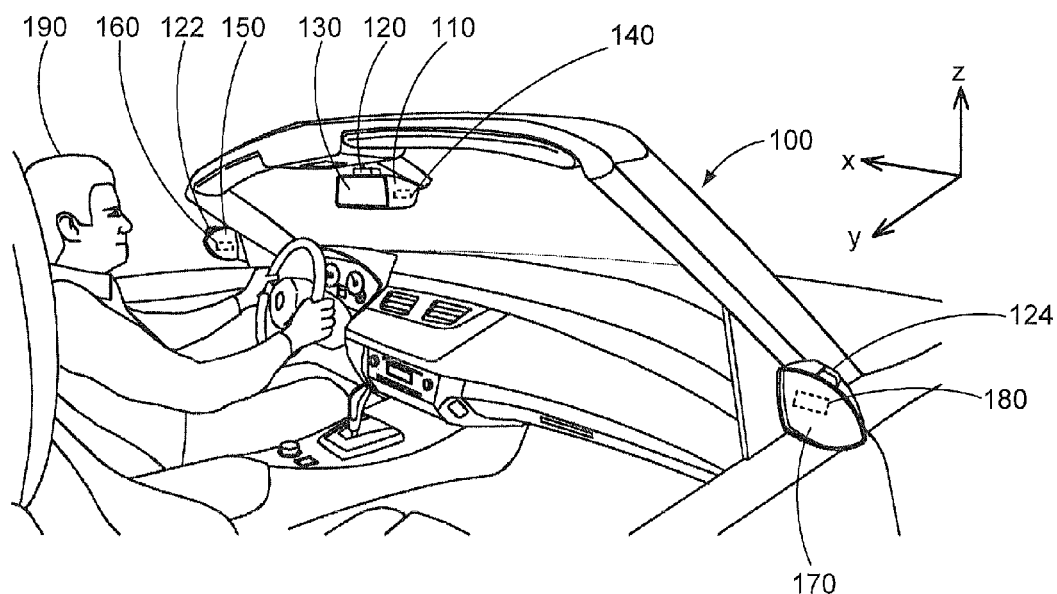
FIG. 1 illustrates a vehicle equipped with an electronic device configured to adjust one or more view mirrors in the vehicle based on one or more captured images of a driver, according to one embodiment of the present disclosure.

FIG. 1 illustrates a vehicle 100 equipped with an electronic device 110 configured to adjust one or more view mirrors 130, 150, and 170 in the vehicle 100 based on one or more captured images of a driver 190. The electronic device 110 may be any electronic device equipped with image capturing and processing capabilities, and may be implemented as a device embedded in the vehicle 100 or in a device such as a smartphone, a navigation device, a video recording device for a car (e.g., a black box, a dashcam, etc.), and the like, which may include image capturing and processing capabilities. The electronic device 110 may be disposed, mounted, or included in any suitable location of the vehicle 100.

As shown, the view mirrors 130, 150, and 170 may be arranged in the vehicle 100 to function as a rear-view mirror, a left side-view mirror, and a right side-view mirror 170, respectively. The view mirrors 130, 150, and 170 may be adjusted in a horizontal direction and a vertical direction. For example, the horizontal direction may be in an x-y plane and the vertical direction may be in a y-z plane.

For adjusting the view mirrors 130, 150, and 170 in the horizontal and vertical directions, a plurality of motor units 140, 160, and 180 may be operatively coupled to the view mirrors 130, 150, and 170, respectively. Each of the motor units 140, 160, and 180 may include one or more motors (e.g., electric motors or actuators) arranged to adjust the view mirrors 130, 150, and 170, respectively, in the horizontal and vertical directions in response to control signals from the electronic device 110. In one embodiment, the electronic device 110 may include the motor units 140, 160, and 180. Alternatively, the motor units 140, 160, and 180 may be external to the electronic device 110.

According to one embodiment, each of the motor units 140, 160, and 180 may include a pair of motors operatively coupled to move the view mirrors 130, 150, and 170, respectively. In this case, one of the motors may be arranged to move a view mirror in the horizontal direction and the other motor may be arranged to move the view mirror in the vertical direction. According to another embodiment, each of the motor units 140, 160, and 180 may be a motor that can be operatively coupled to move the view mirrors 130, 150, and 170 in both the horizontal and vertical directions. In this case, the motor may be arranged to move a view mirror sequentially in the horizontal and vertical directions in any suitable order.

As shown in FIG. 1, a plurality of image sensor units 120, 122, and 124 may be located on or near the view mirrors 130, 150, and 170, respectively, for capturing one or more images of the driver 190. Each of the image sensor units 120, 122, and 124 may include one or more image sensors for capturing the images of the driver 190. Additionally, the image sensor units 120, 122, and 124 may be configured to continuously, periodically, or aperiodically capture images of a head of the driver 190. In one embodiment, the electronic device 110 may include the image sensor units 120, 122, and 124. Alternatively, the image sensor units 120, 122, and 124 may be separate units or modules that can be electrically coupled to the electronic device 110.

The electronic device 110 may be coupled to receive the captured images from the image sensor units 120, 122, and 124 and determine adjustment angles for the view mirrors 130, 150, and 170 based on the captured images. In one embodiment, a pair of angles may be determined for each of the view mirrors 130, 150, and 170. One of the angles may indicate an adjustment angle in the horizontal direction (e.g., the x-y plane) and the other angle may indicate an adjustment angle in the vertical direction (e.g., the y-z plane). The electronic device 110 may then generate control signals corresponding to the adjustment angles for the view mirrors 130, 150, and 170 and transmit the control signals to the associated motor units 140, 160, and 180, respectively.

In response to the associated control signals from the electronic device 110, the motor units 140, 160, and 180 may adjust the corresponding view mirrors 130, 150, and 170, respectively, in the horizontal and vertical directions. Although the vehicle 100 is illustrated with the electronic device 110 with the image sensor units 120, 122, and 124 and the motor units 140, 160, and 180, a separate electronic device may be provided for adjusting each of the view mirrors 130, 150, and 170. In this case, each electronic device may be configured to receive captured images from an associated image sensor unit to determine one or more adjustment angles for the associated view mirror. Based on the adjustment angles, each electronic device may generate one or more control signals for an associated motor unit to move or drive the associated view mirror to the adjustment angles.

Figure 2:
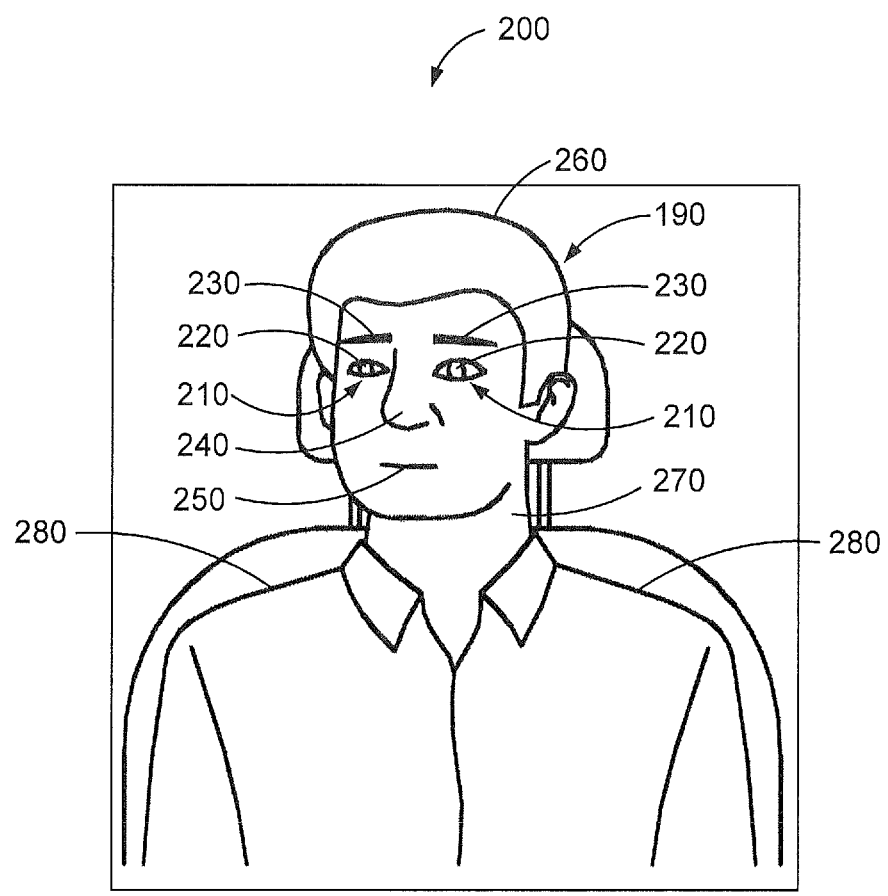
FIG. 2 illustrates an image of a driver captured by an image sensor unit associated with a rear-view mirror in a vehicle, according to one embodiment of the present disclosure.

FIG. 2 illustrates an image 200 of the driver 190 captured by the image sensor unit 120 associated with the rear-view mirror 130 in the vehicle 100, according to one embodiment of the present disclosure. The image 200 depicts the driver 190 who is looking at the rear-view mirror 130. As shown, the image 200 may include facial or body features of the driver 190 such as eyes 210, pupils 220, eyebrows 230, a nose 240, a lip 250, a head 260, a neck 270, shoulders 280, and the like. The electronic device 110 may extract the facial and/or body features from the image 200 for adjusting mirror angles of at least one of the view mirrors 130, 150, and 170. Although the image 200 is illustrated as being captured by the image sensor unit 120 associated with the rear-view mirror 130, the image sensor units 122 and 124 may also capture images of the driver 190 depicting similar facial or body features.

Figure 3:
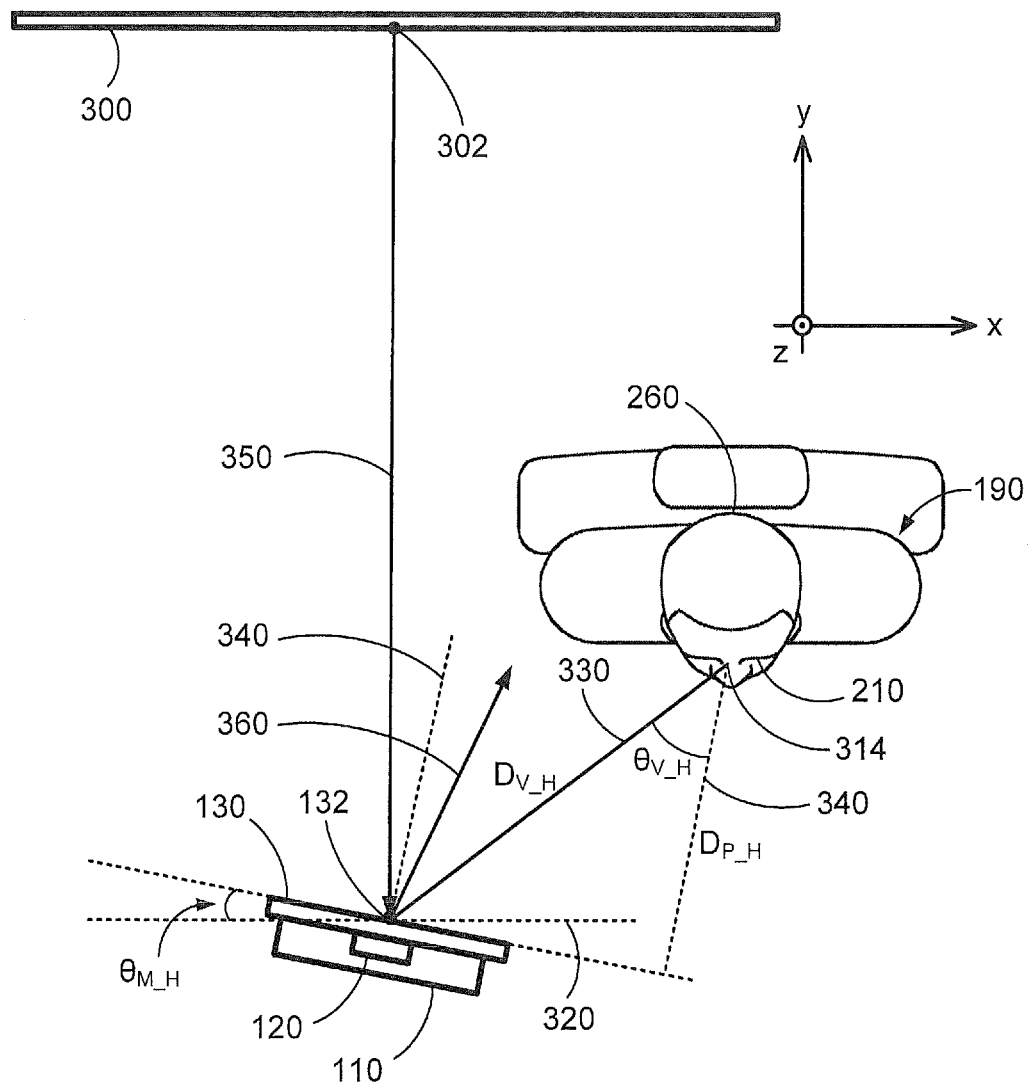
FIG. 3 illustrates a top plan view of a geometric relationship between a head of a driver and a rear-view mirror for determining an adjustment angle of the rear-view mirror in a horizontal plane, according to one embodiment of the present disclosure.

FIG. 3 illustrates a top plan view of a geometric relationship between the head 260 of the driver 190 and the rear-view mirror 130 in the vehicle 100 for determining an adjustment angle of the rear-view mirror 130 in a horizontal plane, according to one embodiment of the present disclosure. In the top plan view of FIG. 3, the geometric relationship may be illustrated with respect to the horizontal plane defined by an x-axis and a y-axis, and angles and directions are shown to be in the horizontal x-y plane. A horizontal direction 320 in the horizontal plane may be parallel to the x-axis and the y-axis is in a direction orthogonal to the x-axis in the horizontal plane.

Initially, the rear-view mirror 130 is set at an angle $\theta_{M\_H}$ with respect to the horizontal direction 320 in the horizontal plane. For example, a mirror plane of the rear-view mirror 130 may form the initial angle of $\theta_{M\_H}$ with respect to the x-axis. The electronic device 110 may obtain the initial angle of $\theta_{M\_H}$. A rear window 300 of the vehicle 100 may be parallel to the x-axis and the horizontal direction 320. Although the rear window 300 is illustrated as a plate glass, the rear window 300 may also be formed of a curved glass.

As shown in FIG. 3, a light ray 350 may be represented as entering the vehicle 100 through a point 302 of the rear window 300 and reflected from a point 132 in the mirror plane of the rear-view mirror 130 as a reflected ray 360. The point 302 may be any point or location in the rear window 300. For example, the point 302 may be a center point in the rear window 300. The point 132 may be any point or location in the mirror plane of the rear-view mirror 130. For example, the point 132 may be a center point in the mirror plane of the rear-view mirror 130. The rear-view mirror 130 may be configured to rotate with respect to a vertical axis (e.g., z-axis) through any point of the rear-view mirror 130. In the illustrated embodiment, the point 132 of the rear-view mirror 130 may define a center of rotation for the rear-view mirror 130 in the horizontal plane. By rotating the rear-view mirror 130 in such a manner, the rear-view mirror 130 may be adjusted to a new angle with respect to the horizontal direction in the horizontal plane.

The image sensor unit 120 in the electronic device 110 may capture an image of the driver 190 including the head 260. From the captured image, the electronic device 110 may determine a viewing location 314 in the head 260, at which location the driver 190 may be represented as viewing the rear-view mirror 130. In one embodiment, pupils of a pair of the eyes 210 of the driver 190 may be detected from the captured image and the viewing location 314 may be determined based on one or more positions of the detected pupils of the eyes 210. For example, the viewing location 314 may be any point or location between the pupils of the eyes 210 such as a midpoint between the detected pupils of the eyes 210 or a position of one of the detected pupils of the eyes 210.

Once the viewing location 314 has been determined, the electronic device 110 may determine a viewing distance $D_{V\_H}$ and a perpendicular distance $D_{P\_H}$ based on the captured image. As used herein, the term "viewing distance" may refer to a distance between a viewing location and any point or location in a mirror plane of a view mirror and the term "perpendicular distance" may refer to a distance between a viewing location and a view mirror along a line that is perpendicular to a mirror plane of the view mirror. In the illustrated embodiment, the viewing distance $D_{V\_H}$ may be a distance between the viewing location 314 and the point 132 in the mirror plane of the rear-view mirror 130 and the perpendicular distance $D_{P\_H}$ may be a distance between the viewing location 314 and the rear-view mirror 130 along a line, which is perpendicular to the mirror plane of the rear-view mirror 130.

In another embodiment, once the viewing location 314 has been determined, the electronic device 110 may determine a view direction of a driver and a perpendicular direction based on the captured image. As used herein, the term "view direction" may refer to a direction corresponding to or defined by a line between a viewing location and any point or location in a mirror plane of a view mirror and the term "perpendicular direction" may refer to a direction orthogonal to a mirror plane of a view mirror. In the illustrated embodiment, the view direction 330 may be a direction corresponding to, or defined by, a line between the viewing location 314 and the point 132 in the mirror plane of the rear-view mirror 130 and the perpendicular direction 340 may be a direction orthogonal to the mirror plane of the rear-view mirror 130.

At least one of the viewing distance $D_{V\_H}$, the perpendicular distance $D_{P\_H}$, the view direction 330, and the perpendicular direction 340 may be determined from one or more images of the driver 190 including the head 260 by employing any suitable depth, distance, or direction perception schemes using a computer monocular vision technique, a computer stereo vision technique, and the like. For example, the computer monocular vision technique may extract three-dimensional information from one or more images that are captured by a camera or an image sensor. In this case, the computer monocular vision technique may use image characteristics in one or more images such as texture variations and gradients, defocus, color/haze, etc. to extract three-dimensional information such as a depth, distance, direction, or the like. In the case of the computer stereo vision technique, three-dimensional information may be extracted from images that are captured by two or more cameras or image sensors. For example, two cameras or image sensors located at different positions may be used to obtain two different views of a scene. The two images may then be compared to obtain three-dimensional information such as a depth, distance, and/or direction.

In the case of one image, for example, at least one of the viewing distance $D_{V\_H}$, the perpendicular distance $D_{P\_H}$, the view direction 330, and the perpendicular direction 340 may be determined from the captured image of the driver 190 using the computer monocular vision technique. Alternatively, the image sensor unit 120 may include two or more image sensors for capturing two or more images of the driver 190 including the head 260. In this case, at least one of the viewing distance $D_{V\_H}$, the perpendicular distance $D_{P\_H}$, the view direction 330, and the perpendicular direction 340 may be determined from the two or more captured images of the driver 190 using the computer stereo vision technique.

Based on the viewing distance $D_{V\_H}$ and the perpendicular distance $D_{P\_H}$, the electronic device 110 may calculate a view angle $\theta_{V\_H}$ of the driver 190 between the view direction 330 and the perpendicular direction 340. In another embodiment, based on the view direction 330 and the perpendicular direction 340, the electronic device 110 may calculate a view angle $\theta_{V\_H}$ of the driver 190. When the view angle $\theta_{V\_H}$ has been obtained, the electronic device 110 may determine an adjustment angle of the rear-view mirror 130 based on the mirror angle $\theta_{M\_H}$ and the view angle $\theta_{V\_H}$. In some embodiments, the adjustment angle of the rear-view mirror 130 may be determined such that a direction of the reflected ray 360 coincides with the view direction 330 of the driver 190. When the direction of the reflected ray 360 coincides with the view direction 330, the view angle $\theta_{V\_H}$ and the angle of reflection for the reflected ray 360 may be equal or the same. Under this condition, the view of the rear window 300 for the driver 190 may be centered on the point 132 in the mirror plane of the rear-view mirror 130.

In one embodiment, the adjustment angle of the rear-view mirror 130 may be determined to be an average of the mirror angle $\theta_{M\_H}$ and the view angle $\theta_{V\_H}$ of the driver 190. In another embodiment, the electronic device 110 may determine one or more interim adjustment angles of the rear-view mirror 130 based on one or more images of the driver 190 captured by the image sensor unit 120. In this case, one interim adjustment angle for the rear-view mirror 130 may be determined from one image and a next interim adjustment angle may be determined from a next image. This process may be repeated until the mirror angle $\theta_{M\_H}$ is equal to the view angle $\theta_{V\_H}$, at which time the electronic device 110 may determine the mirror angle $\theta_{M\_H}$ to be the adjustment angle.

According to one embodiment, the electronic device 110 may determine one or more interim adjustment angles of the rear-view mirror 130 based on whether the mirror angle $\theta_{M\_H}$ is greater or less than the view angle $\theta_{V\_H}$ of the driver 190. For example, when the mirror angle $\theta_{M\_H}$ is greater than the view angle $\theta_{V\_H}$, the electronic device 110 may determine an interim adjustment angle of the rear-view mirror 130 by reducing the mirror angle $\theta_{M\_H}$ by a predetermined angle. On the other hand, when the mirror angle $\theta_{M\_H}$ is less than the view angle $\theta_{V\_H}$, the interim adjustment angle of the rear-view mirror 130 may be determined by increasing the mirror angle $\theta_{M\_H}$ by a predetermined angle. The process of reducing or increasing the mirror angle $\theta_{M\_H}$ may be repeated any suitable number of times by using the previous interim adjustment angle as a new mirror angle $\theta_{M\_H}$. When the mirror angle $\theta_{M\_H}$ is equal to the view angle $\theta_{V\_H}$, the electronic device 110 may determine the mirror angle $\theta_{M\_H}$ to be the adjustment angle of the rear-view mirror 130.

Figure 4:
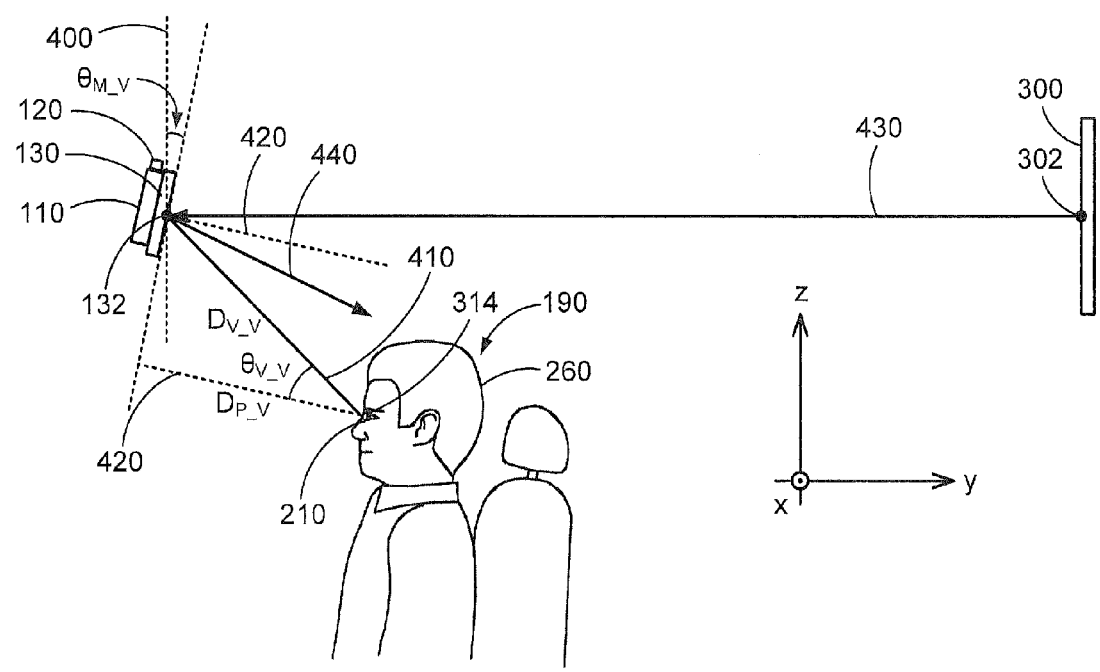
FIG. 4 illustrates a side plan view of a geometric relationship between a head of a driver and a rear-view mirror for determining an adjustment angle of the rear-view mirror in a vertical plane, according to one embodiment of the present disclosure.

FIG. 4 illustrates a side plan view of a geometric relationship between the head 260 of the driver 190 and the rear-view mirror 130 in the vehicle 100 for determining an adjustment angle of the rear-view mirror 130 in a vertical plane, according to one embodiment of the present disclosure. In the side plan view of FIG. 4, the geometric relationship may be illustrated with respect to the vertical plane defined by a y-axis and a z-axis, and angles and directions are shown to be in the vertical y-z plane. A vertical direction 400 in the vertical plane may be parallel to the z-axis and the y-axis is in a direction orthogonal to the z-axis in the vertical plane.

Initially, the rear-view mirror 130 is set at an angle $\theta_{M\_V}$ with respect to the vertical direction 400 in the vertical plane. For example, a mirror plane of the rear-view mirror 130 may form the initial angle of $\theta_{M\_V}$ with respect to the z-axis. The electronic device 110 may obtain the initial angle of $\theta_{M\_V}$. The rear window 300 of the vehicle 100 may be parallel to the z-axis and the vertical direction 400. Although the rear window 300 is illustrated as a plate glass, the rear window 300 may also be formed of a curved glass.

As shown in FIG. 4, a light ray 430 may be represented as entering the vehicle 100 through the point 302 of the rear window 300 and reflected from the point 132 in the mirror plane of the rear-view mirror 130 as a reflected ray 440. The rear-view mirror 130 may be configured to rotate with respect to a horizontal axis (e.g., x-axis) through any point of the rear-view mirror 130. In the illustrated embodiment, the point 132 of the rear-view mirror 130 may define a center of rotation for the rear-view mirror 130 in the vertical plane. By rotating the rear-view mirror 130 in such a manner, the rear-view mirror 130 may be adjusted to a new angle with respect to the vertical direction in the vertical plane.

The image sensor unit 120 in the electronic device 110 may capture an image of the driver 190 including the head 260. From the captured image, the electronic device 110 may determine the viewing location 314 in the head 260, at which location the driver 190 may be represented as viewing the rear-view mirror 130. In one embodiment, pupils of the eyes 210 of the driver 190 may be detected from the captured image and the viewing location 314 may be determined based on one or more positions of the detected pupils of the eyes 210. For example, the viewing location 314 may be any point or location between the pupils of the eyes 210 such as a midpoint between the detected pupils of the eyes 210 or a position of one of the detected pupils of the eyes 210.

Once the viewing location 314 has been determined, the electronic device 110 may determine a viewing distance $D_{V\_V}$ and a perpendicular distance $D_{P\_V}$ in the vertical plane based on the captured image. In the illustrated embodiment, the viewing distance $D_{V\_V}$ may be a distance between the viewing location 314 and the point 132 in the mirror plane of the rear-view mirror 130 and the perpendicular distance $D_{P\_V}$ may be a distance between the viewing location 314 and the rear-view mirror 130 along a line that is perpendicular to the mirror plane of the rear-view mirror 130. In another embodiment, once the viewing location 314 has been determined, the electronic device 110 may determine a view direction 410 of the driver 190 and a perpendicular direction 420 in the vertical plane based on the captured image. In the illustrated embodiment, the view direction 410 may be a direction corresponding to a line between the viewing location 314 and the point 132 in the mirror plane of the rear-view mirror 130 and the perpendicular direction 420 may be a direction orthogonal to the mirror plane of the rear-view mirror 130.

According to one embodiment, at least one of the viewing distance $D_{V\_V}$, the perpendicular distance $D_{P\_V}$, the view direction 410, and the perpendicular direction 420 may be determined from one or more images of the driver 190 including the head 260 by employing any suitable depth, distance, or direction perception schemes using a computer monocular vision technique, a computer stereo vision technique, and the like. In the case of one image, for example, at least one of the viewing distance $D_{V\_V}$, the perpendicular distance $D_{P\_V}$, the view direction 410, and the perpendicular direction 420 may be determined from the captured image of the driver 190 using the computer monocular vision technique. Alternatively, the image sensor unit 120 may include two or more image sensors for capturing two or more images of the driver 190 including the head 260. In this case, at least one of the viewing distance $D_{V\_V}$, the perpendicular distance $D_{P\_V}$, the view direction 410, and the perpendicular direction 420 may be determined from the two or more captured images of the driver using the computer stereo vision technique.

Based on the viewing distance $D_{V\_V}$ and the perpendicular distance $D_{P\_V}$, the electronic device 110 may calculate a view angle $\theta_{V\_V}$ of the driver 190 between the view direction 410 and the perpendicular direction 420. In another embodiment, based on the view direction 410 and the perpendicular direction 420, the electronic device 110 may calculate a view angle $\theta_{V\_V}$ of the driver 190. When the view angle $\alpha_{V\_V}$ has been obtained, the electronic device 110 may determine an adjustment angle of the rear-view mirror 130 based on the mirror angle $\theta_{M\_V}$ and the view angle $\theta_{V\_V}$. In some embodiments, the adjustment angle of the rear-view mirror 130 may be determined such that a direction of the reflected ray 440 coincides with the view direction 410 of the driver 190. When the direction of the reflected ray 440 coincides with the view direction 410, the view angle $\theta_{V\_V}$ and the angle of reflection for the reflected ray 440 may be equal or the same. Under this condition, the view of the rear window 300 for the driver 190 may be centered on the point 132 in the mirror plane of the rear-view mirror 130.

In one embodiment, the adjustment angle of the rear-view mirror 130 may be determined to be an average of the mirror angle $\theta_{M\_V}$ and the view angle $\theta_{V\_V}$ of the driver 190. In another embodiment, the electronic device 110 may determine one or more interim adjustment angles of the rear-view mirror 130 based on one or more images of the driver 190 captured by the image sensor unit 120. In this case, one interim adjustment angle for the rear-view mirror 130 may be determined from one image and a next interim adjustment angle may be determined from a next image. This process may be repeated until the mirror angle $\theta_{M\_V}$ is equal to the view angle $\theta_{V\_V}$, at which time the electronic device 110 may determine the mirror angle $\theta_{M\_V}$ to be the adjustment angle.

According to one embodiment, the electronic device 110 may determine one or more interim adjustment angles of the rear-view mirror 130 based on whether the mirror angle $\theta_{M\_V}$ is greater or less than the view angle $\theta_{V\_V}$ of the driver 190. For example, when the mirror angle $\theta_{M\_V}$ is greater than the view angle $\theta_{V\_V}$, the electronic device 110 may determine an interim adjustment angle of the rear-view mirror 130 by reducing the mirror angle $\theta_{M\_V}$ by a predetermined angle. On the other hand, when the mirror angle $\theta_{M\_V}$ is less than the view angle $\theta_{V\_V}$, the interim adjustment angle of the rear-view mirror 130 may be determined by increasing the mirror angle $\theta_{M\_V}$ by a predetermined angle. The process of reducing or increasing the mirror angle $\theta_{M\_V}$ may be repeated any suitable number of times by using the previous interim adjustment angle as a new mirror angle $\theta_{M\_V}$. When the mirror angle $\theta_{M\_V}$ is equal to the view angle $\theta_{V\_V}$, the electronic device 110 may determine the mirror angle $\theta_{M\_V}$ to be the adjustment angle of the rear-view mirror 130.

Figure 5:
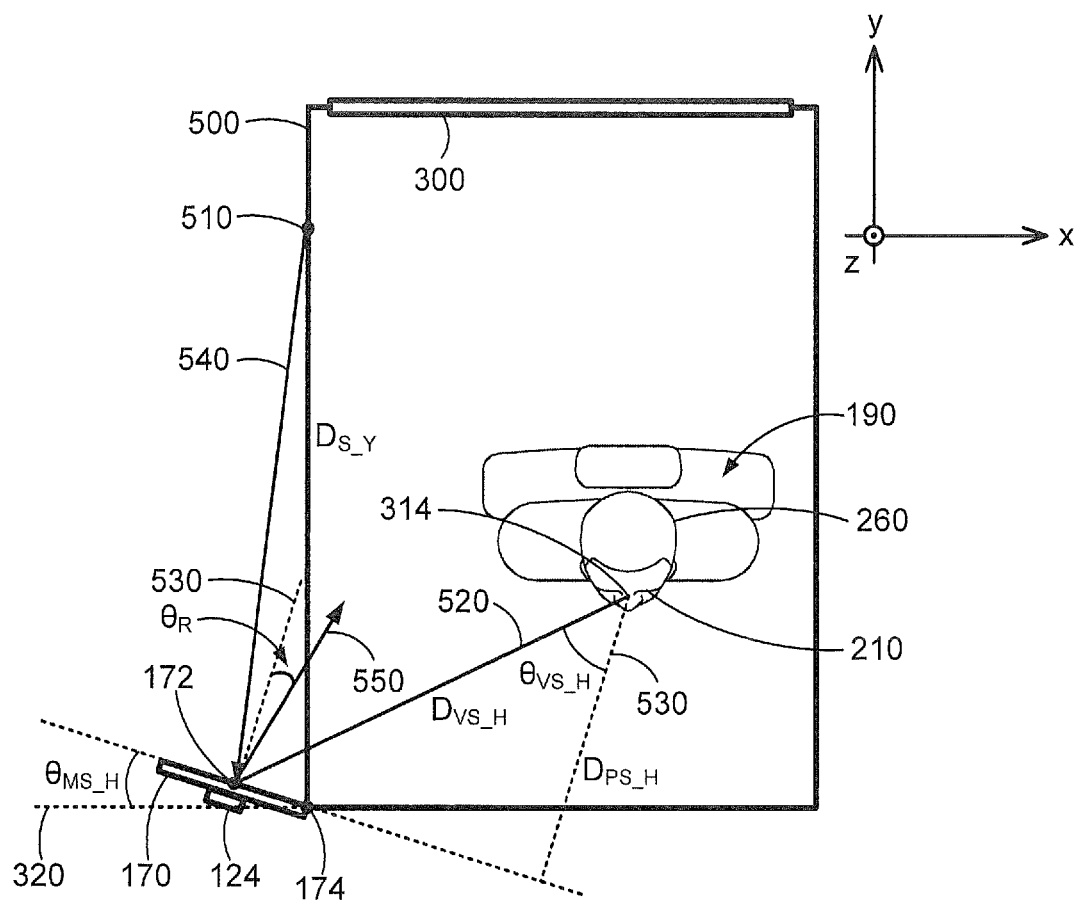
FIG. 5 illustrates a top plan view of a geometric relationship between a head of a driver and a right side-view mirror for determining an adjustment angle of the right side-view mirror in a horizontal plane, according to one embodiment of the present disclosure.

FIG. 5 illustrates a top plan view of a geometric relationship between the head 260 of the driver 190 and the right side-view mirror 170 in the vehicle 100 for determining an adjustment angle of the right side-view mirror 170 in a horizontal plane, according to one embodiment of the present disclosure. Although the right side-view mirror 170 is illustrated in FIG. 5, an adjustment angle of the left side-view mirror 150 may also be determined in a similar manner. In FIG. 5, the geometric relationship may be illustrated with respect to the horizontal plane defined by an x-axis and a y-axis, and angles and directions are shown to be in the horizontal x-y plane. The horizontal direction 320 in the horizontal plane may be parallel to the x-axis and the y-axis is in a direction orthogonal to the x-axis in the horizontal plane.

Initially, the right side-view mirror 170 is set at an angle $\theta_{MS\_H}$ with respect to the horizontal direction 320 in the horizontal plane. For example, a mirror plane of the right side-view mirror 170 may form the initial angle $\theta_{MS\_H}$ with respect to the x-axis or the horizontal direction 320. As shown in FIG. 5, a light ray 540 may be represented as being incident on the right side-view mirror 170 from a predetermined location 510 on a right side 500 of the vehicle 100, and reflected from a point 172 of the right side-view mirror 170 as a reflected ray 550. The predetermined location 510 may be selected to be any suitable location to represent a point of a side view and may be located on the side of the vehicle 100 or a position near the side of the vehicle 100. The point 172 may be any point or location in the mirror plane of the right side-view mirror 170. For example, the point 172 may be a center point in the mirror plane of the right side-view mirror 170. The right side-view mirror 170 may be configured to rotate with respect to a vertical axis (e.g., z-axis) through any point of the right side-view mirror 170. In the illustrated embodiment, a right endpoint 174 of the right side-view mirror 170 may define a center of rotation for the right side-view mirror 170 in the horizontal plane. By rotating the right side-view mirror 170 with respect to the right endpoint 174, the right side-view mirror 170 may be adjusted to a new angle with respect to the horizontal direction in the horizontal plane.

In the illustrated embodiment, the image sensor unit 124 mounted on or near the right side-view mirror 170 may be configured to capture an image of the driver 190 including the head 260. The captured image may then be provided to the electronic device 110 for processing. Although the electronic device 110 is illustrated in FIGS. 1, 3, and 4 as being mounted on or near the rear-view mirror 130, it may be located on or near the right side-view mirror 170. Alternatively, the electronic device 110 may be provided for each of the view mirrors 130, 150, and 170.

From the image of the driver 190 received from the image sensor unit 124, the electronic device 110 may determine the viewing location 314 in the head 260, at which location the driver 190 may be represented as viewing the right side-view mirror 170. In one embodiment, pupils of the eyes 210 of the driver 190 may be detected from the captured image and the viewing location 314 may be determined based on one or more positions of the detected pupils of the eyes 210. For example, the viewing location 314 may be any point or location between the pupils of the eyes 210 such as a midpoint between the detected pupils of the eyes 210 or a position of one of the detected pupils of the eyes 210.

Once the viewing location 314 has been determined, the electronic device 110 may determine a viewing distance $D_{VS\_H}$ and a perpendicular distance $D_{PS\_H}$ in the horizontal plane based on the captured image. In another embodiment, once the viewing location 314 has been determined, the electronic device 110 may determine a view direction 520 of the driver 190 and a perpendicular direction 530 based on the captured image. According to one embodiment, at least one of the viewing distance $D_{VS\_H}$, the perpendicular distance $D_{PS\_H}$, the view direction 520, and the perpendicular direction 530 may be determined from one or more captured images of the driver 190 including the head 260 by employing any suitable depth, distance, or direction perception schemes using a computer monocular vision technique, a computer stereo vision technique, and the like. Based on the viewing distance $D_{VS\_H}$ and the perpendicular distance $D_{PS\_H}$, the electronic device 110 may calculate a view angle $\theta_{VS\_H}$ of the driver 190 between the view direction 520 and the perpendicular direction 530. In another embodiment, based on the view direction 520 and the perpendicular direction 530, the electronic device 110 may calculate the view angle $\theta_{VS\_H}$ of the driver 190.

When the view angle $\theta_{VS\_H}$ has been obtained, the electronic device 110 may determine an adjustment angle of the right side-view mirror 170 based on the mirror angle $\theta_{MS\_H}$ and the view angle $\theta_{VS\_H}$. In one embodiment, the adjustment angle of the right side-view mirror 170 may be determined such that a direction of the reflected ray 550 coincides with the view direction 520 of the driver 190. When the direction of the reflected ray 550 coincides with the view direction 520, the view angle $\theta_{VS\_H}$ and the angle of reflection $\theta_R$ for the reflected ray 550 may be equal or the same. Under this condition, the side view for the driver 190 may be centered on the point 172 in the mirror plane of the right side-view mirror 170 and the angle of reflection $\theta_R$ may be determined based on the mirror angle $\theta_{MS\_H}$ and geometric arrangements or relationships between the predetermined location 510 and the right side-view mirror 170. The geometric relationships may include a horizontal distance $D_{S\_X}$ (not shown) along the x-axis, a horizontal distance $D_{S\_Y}$ along the y-axis, and a vertical distance $D_{S\_Z}$ (not shown) along the z-axis between the predetermined location 510 and the right endpoint 174 of the mirror plane of the right side-view mirror 170.

In some embodiments, the electronic device 110 may determine one or more interim adjustment angles of the right side-view mirror 170 based on one or more images of the driver 190 captured by the image sensor unit 124. In this case, one interim adjustment angle for the right side-view mirror 170 may be determined from one image and a next interim adjustment angle may be determined from a next image. This process may be repeated until the angle of reflection $\theta_R$ is equal to the view angle $\theta_{VS\_H}$, at which time the electronic device 110 may determine the mirror angle $\theta_{MS\_H}$ to be the adjustment angle.

According to one embodiment, the one or more interim adjustment angles of the right side-view mirror 170 may be determined based on whether the angle of reflection $\theta_R$ is greater or less than the view angle $\theta_{VS\_H}$ of the driver 190. For example, when the angle of reflection $\theta_R$ is greater than the view angle $\theta_{VS\_H}$, the electronic device 110 may determine an interim adjustment angle of the right side-view mirror 170 by reducing the mirror angle $\theta_{MS\_H}$ by a predetermined angle. On the other hand, when the angle of reflection $\theta_R$ is less than the view angle $\theta_{VS\_H}$, the interim adjustment angle of the right side-view mirror 170 may be determined by increasing the mirror angle $\theta_{MS\_H}$ by a predetermined angle. The process of reducing or increasing the mirror angle $\theta_{MS\_H}$ may be repeated any suitable number of times by using the previous interim adjustment angle as a new mirror angle $\theta_{MS\_H}$. When the angle of reflection $\theta_R$ is equal to the view angle $\theta_{VS\_H}$, the electronic device 110 may determine the mirror angle $\theta_{MS\_H}$ to be the adjustment angle of the right side-view mirror 170. Although the adjustment angle for the right side-view mirror 170 in the horizontal plane is illustrated in FIG. 5, the adjustment angle for the right side-view mirror 170 in the vertical plane may also be determined in a similar manner.

Figure 6:
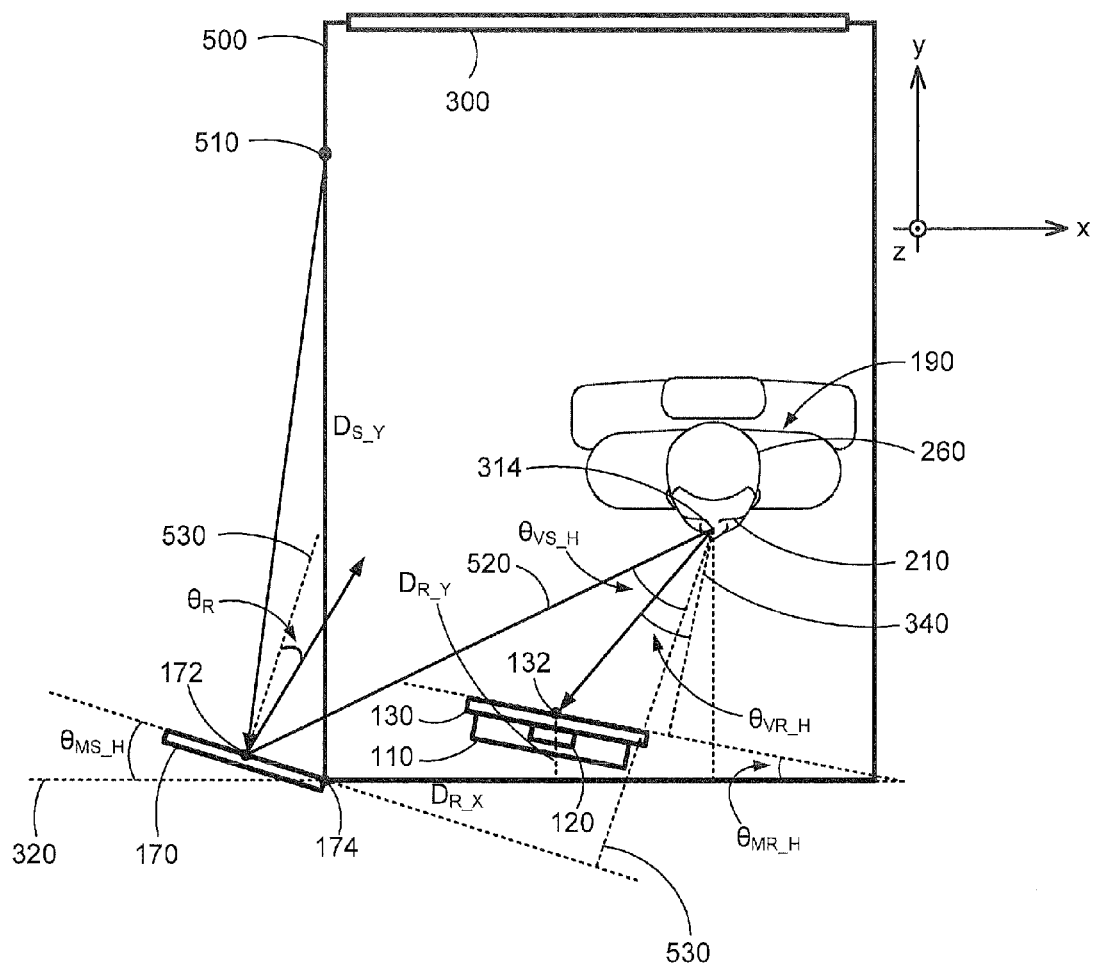
FIG. 6 illustrates a top plan view of geometric relationships among a head of a driver, a rear-view mirror, and a right side-view mirror for determining an adjustment angle of the right side-view mirror in a horizontal plane, according to one embodiment of the present disclosure.

FIG. 6 illustrates a top plan view of geometric relationships among the head 260 of the driver 190, the rear-view mirror 130, and the right side-view mirror 170 in the vehicle 100 for determining an adjustment angle of the right side-view mirror 170 in a horizontal plane, according to one embodiment of the present disclosure. Although the right side-view mirror 170 is illustrated in FIG. 6, an adjustment angle of the left side-view mirror 150 may also be determined in a similar manner. In FIG. 6, the geometric relationships may be illustrated with respect to the horizontal plane defined by an x-axis and a y-axis, and angles and directions are shown to be in the horizontal x-y plane. The horizontal direction 320 in the horizontal plane may be parallel to the x-axis and the y-axis is in a direction orthogonal to the x-axis in the horizontal plane.

Initially, the rear-view mirror 130 is set at an angle $\theta_{MR\_H}$ with respect to the horizontal direction 320 and the right side-view mirror 170 is set at an angle $\theta_{MS\_H}$ with respect to the horizontal direction 320 in the horizontal plane. As shown, a mirror plane of the rear-view mirror 130 may form the initial angle of $\theta_{MR\_H}$ with respect to the x-axis or the horizontal direction 320, and a mirror plane of the right side-view mirror 170 may form the initial angle of $\theta_{MS\_H}$ with respect to the x-axis or the horizontal direction 320. In this arrangement, the electronic device 110 may determine a view angle $\theta_{VS\_H}$ of the driver 190 for the right side-view mirror 170 in the horizontal plane based on the initial mirror angle $\theta_{MS\_H}$ of the right side-view mirror 170, the initial mirror angle $\theta_{MR\_H}$ and a view angle $\theta_{VR\_H}$ of the rear-view mirror 130, and the geometric relationship between the right side-view mirror 170 and the rear-view mirror 130.

In one embodiment, the view angle $\theta_{VR\_H}$ of the driver 190 for the rear-view mirror 130 in the horizontal plane may be calculated based on one or more images captured by the image sensor unit 120 associated with the rear-view mirror 130 as described above with reference to FIG. 3. From the initial mirror angle $\theta_{MR\_H}$ and the view angle $\theta_{VR\_H}$ for the rear-view mirror 130, and the initial mirror angle $\theta_{MS\_H}$ for the right side-view mirror 170, the electronic device 110 may then determine the view angle $\theta_{VS\_H}$ of the driver 190 for the right side-view mirror 170 in the horizontal plane based on geometric arrangements or relationships between the rear-view mirror 130 and the right side-view mirror 170. The geometric relationships between the rear-view mirror 130 and the right side-view mirror 170 may include a horizontal distance $D_{R\_X}$ along the x-axis, a horizontal distance $D_{R\_Y}$ along the y-axis, and a vertical distance $D_{R\_Z}$ (not shown) along the z-axis between the center point 132 of the rear-view mirror 130 and the right endpoint 174 of the mirror plane of the right side-view mirror 170.

Although the view angle $\theta_{VS\_H}$ for the right side-view mirror 170 in the horizontal plane is illustrated in FIG. 6, the view angle for the right side-view mirror 170 in the vertical plane may also be determined in a similar manner. Once the view angle $\theta_{VS\_H}$ of the driver 190 for the right side-view mirror 170 has been obtained, the electronic device 110 may determine an adjustment angle of the right side-view mirror 170 in a similar manner as described in FIG. 5 by determining one or more interim adjustment angles of the right side-view mirror 170 based on the view angle $\theta_{VS\_H}$ and the angle of reflection $\theta_R$. The angle of reflection $\theta_R$ may be determined based on the mirror angle $\theta_{MS\_H}$ and the geometric relationship between the predetermined location 510 and the right side-view mirror 170.

Figure 7:
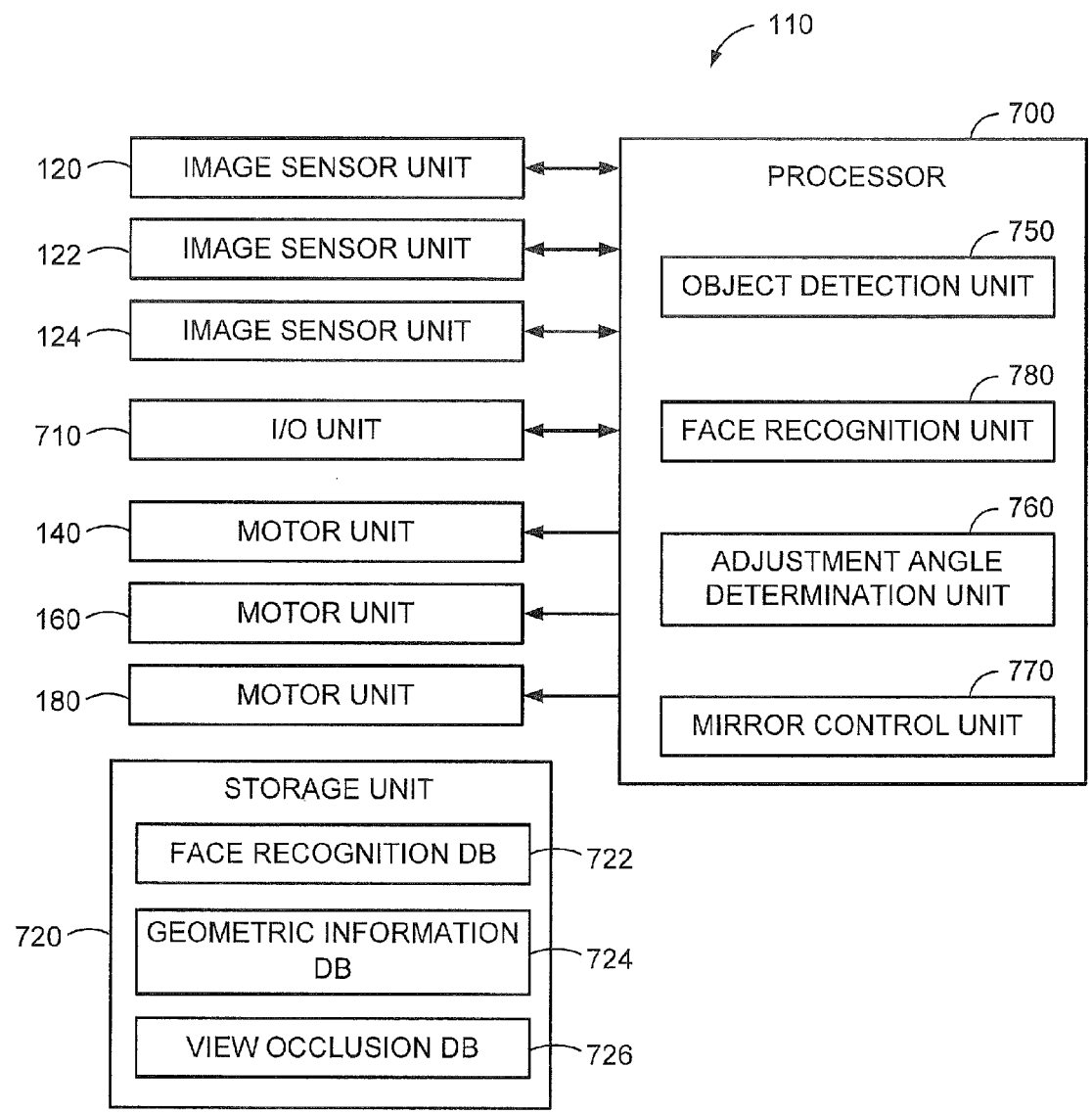
FIG. 7 illustrates a block diagram of an electronic device configured to adjust one or more view mirrors in a vehicle based on one or more captured images of a driver, according to one embodiment of the present disclosure.

FIG. 7 illustrates a block diagram of the electronic device 110 configured to adjust the view mirrors 130, 150, and 170 in the vehicle 100 based on one or more captured images of the driver 190, according to one embodiment of the present disclosure. The electronic device 110 may include the image sensor units 120, 122, and 124, a processor 700, an I/O (input/output) unit 710, the motor units 140, 160, and 180, and a storage unit 720. As described with reference to FIG. 1, the image sensor unit 120 and the motor unit 140 may be used for controlling the rear-view mirror 130, while the image sensor units 122 and 124 along with the motor units 160 and 180, respectively, may be used to control the side-view mirrors 150 and 170, respectively.

Although the electronic device 110 is illustrated as including the image sensor units 120, 122, and 124 and the motor units 140, 160, and 180 for controlling the view mirrors 130, 150, and 170, it may include any subset of such units. For example, the electronic device 110 may include the image sensor units 120, 122, and 124 internally and may be electrically coupled to the motor units 140, 160, and 180, one or more of which may be provided externally. Additionally or alternatively, one or more of the image sensor units 120, 122, and 124 may be provided external to the electronic device 110. The electronic device 110 may also include the image sensor unit 120 and the motor unit 140 for controlling the rear-view mirror 130 and the side-view mirrors 150 and 170 may be controlled by one or more other electronic devices.

The image sensor units 120, 122, and 124 associated with the view mirrors 130, 150, and 170, respectively, may be configured to capture one or more images of the driver 190. For example, each of the image sensor units 120, 122, and 124 may capture one or more images of the driver 190 in the vehicle 100. Additionally, each of the image sensor units 120, 122, and 124 may include one or more image sensors, each of which may be configured to capture one or more images of the driver 190.

The I/O unit 710 may include one or more I/O devices (e.g., a touch screen) and/or a peripheral interface configured to communicate with a controller in the vehicle 100. In one embodiment, the peripheral interface may communicate via an on-board diagnostics (OBD) interface or other suitable interfaces of the vehicle 100 to receive data relating to the operation of the vehicle 100 or traffic conditions near the vehicle 100. For example, the I/O unit 710 may receive data relating to an operating mode of the vehicle 100 (e.g., a parking or reverse mode), traffic information near the vehicle 100 (e.g., vehicle traffic), and the like.

The storage unit 720 may store data and instructions for operating the electronic device 110 and may store one or more images captured by the image sensor units 120, 122, and 124. The storage unit 720 may also store a face recognition database 722, a geometric information database 724, and a view occlusion database 726. The face recognition database 722 may include a plurality of facial features associated with one or more drivers of the vehicle 100, including the driver 190, and one or more mirror adjustment angles that are determined for each of the drivers. The geometric information database 724 may include information on geometric arrangements or relationships among the view mirrors 130, 150, and 170 and the rear window 300. For example, the geometric information database 724 may include information on geometric relationships between the rear-view mirror 130 and the right side-view mirror 170 such as a horizontal distance $D_{R\_X}$ along the x-axis, a horizontal distance $D_{R\_Y}$ along the y-axis, and a vertical distance $D_{R\_Z}$ along the z-axis between the center point 132 of the rear-view mirror 130 and the right endpoint 174 of the mirror plane of the right side-view mirror 170.

The view occlusion database 726 in the storage unit 720 may include a plurality of horizontal threshold angles and a plurality of vertical threshold angles that are mapped to a plurality of percentages of views for the view mirrors 130, 150, and 170. For example, the view occlusion database 726 may include a plurality of percentages of view for the rear-view mirror 130. Each of the percentages of view may represent a percentage of the view of the rear window 300 that a driver may see in the rear-view mirror 130 based on a horizontal threshold angle and a vertical threshold angle. Each of the percentages may be mapped to one or more horizontal threshold angles and one or more vertical threshold angles. The horizontal threshold angles and vertical threshold angles may be used as threshold angles to determine whether to adjust the rear-view mirror 130.

According to one embodiment, the view occlusion database 726 may be generated by calculating a plurality of percentages of the view of the rear window 300 that is seen in the rear-view mirror 130 based on a set of horizontal mirror and view angles and a set of vertical mirror and view angles. For example, given a horizontal mirror angle and a horizontal view angle, a difference between these angles may be calculated as a horizontal threshold angle. Similarly, a difference between a vertical mirror angle and a vertical view angle may be calculated as a vertical threshold angle. Based on the differences in the horizontal and vertical angles, a percentage of the view of the rear window 300 in the rear-view mirror 130 may then be determined to generate the view occlusion database 726 for the rear-view mirror 130. In some embodiments, percentages of the view of the rear window 300 may also reflect the size of the mirror plane of the rear-view mirror 130 and the distance between the rear-view mirror 130 and the rear window 300. The view occlusion database 726 for the side-view mirrors 150 and 170 may also be generated in a similar manner.

In one embodiment, if a difference between a mirror angle and a view angle in the horizontal plane is greater than the horizontal threshold angle, the electronic device 110 may determine that the rear-view mirror 130 is to be adjusted in the horizontal plane. On the other hand, if a difference between a mirror angle and a view angle in the vertical plane is greater than the vertical threshold angle, it may be determined that the rear-view mirror 130 is to be adjusted in the vertical plane. If it is determined that the rear-view mirror 130 is to be adjusted in both the horizontal and vertical planes, it may indicate that a driver's view of the rear window 300 in the rear-view mirror 130 is less than a percentage of the view associated with the horizontal and vertical threshold angles. The electronic device 110 may also determine whether to adjust the side-view mirror 150 or 170 in a similar manner.

The processor 700 may include an object detection unit 750, an adjustment angle determination unit 760, a mirror control unit 770, and a face recognition unit 780. The processor 700 may be implemented using any suitable processing unit such as a central processing unit (CPU), an application processor, a microprocessor, or the like that can execute instructions or perform operations of the electronic device 110. The processor 700 is configured to receive one or more images of the driver 190 captured by the image sensor units 120, 122, and 124 and generate control signals for adjusting the view mirrors 130, 150, and 170 via the motor units 140, 160, and 180. In another embodiment, the processor 700 may receive one or more images of the driver 190 captured by the image sensor unit 120 and generate control signals for adjusting the rear-view mirror 130 and the side-view mirrors 150 and 170 based on the geometric information database 724.

In the processor 700, the object detection unit 750 may receive one or more images of the driver 190 captured by each of the image sensor units 120, 122, and 124 and extract features of the driver 190 for each of the received images using any suitable computer vision techniques such as feature detection methods or pattern recognition methods. The features that are extracted from each of the images may include one or more facial features such as pupils, eyes, eyebrows, a nose, a lip, and a shape of a face, a head, a neck, and/or shoulders of the driver 190. The extracted features may then be processed for recognizing a face and/or determining one or more adjustment angles for the view mirrors 130, 150, and 170.

In one embodiment, the face recognition unit 780 may be configured to receive the one or more facial features such as eyes, eyebrows, a nose, a lip, and/or a shape of a face or a head of the driver 190. Based on the received facial features, the face recognition unit 780 may perform a facial recognition analysis by accessing the face recognition database 722 in the storage unit 720. In this process, the facial features may be compared with reference facial features in the face recognition database 722 to recognize the driver 190.

Once the driver 190 is recognized, the face recognition unit 780 may retrieve predetermined adjustment angles from the face recognition database 722 that are associated with each of the view mirrors 130, 150, and 170 for the identified driver 190, and provide the adjustment angles to the mirror control unit 770. On the other hand, if a driver is not identified based on the face recognition database 722, the face recognition unit 780 may provide the received facial features to the adjustment angle determination unit 760 for use in updating the face recognition database 722. In this case, the adjustment angle determination unit 760 may determine one or more adjustment angles for the mirrors 130, 150, and 170 and update the face recognition database 722 with the facial features and the adjustment angles for storage in the storage unit 720. In this manner, a driver in the vehicle may initially be recognized from one or more images and the mirrors 130, 150, and 170 may be adjusted according to one or more predetermined angles associated with the driver in the face recognition database 722.

One or more features extracted from each of the images such as pupils, eyes, a head, a neck, and/or shoulders of the driver 190 may be used for determining one or more adjustment angles for the view mirrors 130, 150, and 170. In one embodiment, the object detection unit 750 may detect one or more pupils of a pair of eyes of the driver 190 from the one or more captured images using any suitable computer vision techniques such as feature detection methods or pattern recognition methods. Based on the one or more detected pupils of the eyes in the captured images, the object detection unit 750 may determine one or more positions of the detected pupils and determine a viewing location in the head 260 of the driver 190 for each of the view mirrors 130, 150, and 170. In some embodiments, the viewing location may be determined to be any point or location between the pupils of the eyes such as a midpoint between the detected pupils of the eyes or a position of one of the detected pupils of the eyes.

Once the viewing location is determined, the adjustment angle determination unit 760 may determine a viewing distance $D_{V\_H}$ and a perpendicular distance $D_{P\_H}$ in a horizontal plane (e.g., an x-y plane) and a viewing distance $D_{V\_V}$ and a perpendicular distance $D_{P\_V}$ in a vertical plane (e.g., a y-z plane) for each of the view mirrors 130, 150, and 170 based on the one or more captured images including the head 260 of the driver 190. In another embodiment, once the viewing location is determined, the adjustment angle determination unit 760 may determine a view direction and a perpendicular direction in a horizontal plane (e.g., an x-y plane) and a view direction and a perpendicular direction in a vertical plane (e.g., a y-z plane) for each of the view mirrors 130, 150, and 170 based on the one or more captured images including the head 260 of the driver 190. For example, at least one of the viewing and perpendicular distances, and the view and perpendicular directions may be determined from one or more images of the driver 190 including the head 260 by employing any suitable depth, distance, or direction perception schemes using a computer monocular vision technique, a computer stereo vision technique, and the like. In this case, the adjustment angle determination unit 760 may use geometric arrangements or relationships between the image sensor units 120, 122, and 124 and the view mirrors 130, 150, and 170 in determining at least one of the viewing and perpendicular distances, and the view and perpendicular directions.

Additionally or alternatively, the electronic device 110 may determine the viewing or perpendicular distances and the view or perpendicular directions in the horizontal and vertical planes by using one or more distance sensors (not shown) such as an infrared sensor, an ultrasound sensor, etc. One or more distance sensors may be located on or near the view mirrors 130, 150, and 170. In this case, the adjustment angle determination unit 760 may use geometric arrangements or relationships between one or more distance sensors and the view mirrors 130, 150, and 170 in determining at least one of the viewing or perpendicular distances, and the view or perpendicular directions.

Based on the determined viewing and perpendicular distances, the adjustment angle determination unit 760 may calculate view angles of the driver 190 in the horizontal and vertical planes for each of the view mirrors 130, 150, and 170. For example, a view angle $\theta_{V\_H}$ of the driver 190 in the horizontal plane may be determined based on the viewing distance $D_{V\_H}$ and the perpendicular distance $D_{P\_H}$. In a similar manner, the adjustment angle determination unit 760 may calculate a view angle $\theta_{V\_V}$ of the driver 190 in the vertical plane based on the viewing distance $D_{V\_V}$ and the perpendicular distance $D_{P\_V}$. In another embodiment, based on the determined view and perpendicular directions, the adjustment angle determination unit 760 may calculate view angles of the driver 190 in the horizontal and vertical planes for each of the view mirrors 130, 150, and 170. For example, a view angle $\theta_{V\_H}$ of the driver 190 in the horizontal plane may be determined based on the view and perpendicular directions in the horizontal plane. In a similar manner, the adjustment angle determination unit 760 may calculate a view angle $\theta_{V\_V}$ of the driver 190 in the vertical plane based on the view and perpendicular directions in the vertical plane.

In some embodiments, the adjustment angle determination unit 760 may determine view angles $\theta_{VS\_H}$ and $\theta_{VS\_V}$ in the horizontal and vertical planes, respectively, for the side-view mirror 150 or 170 based on one or more images captured by the image sensor unit 120 for the rear-view mirror 130. As described above, the view angles $\theta_{VR\_H}$ and $\theta_{VR\_V}$ for the rear-view mirror 130 in the horizontal and vertical planes, respectively, may be determined initially by calculating the viewing and perpendicular distances or the view and perpendicular directions in the horizontal and vertical planes from one or more images captured by the image sensor unit 120. In this case, the view angles $\theta_{VS\_H}$ and $\theta_{VS\_V}$ for the side-view mirror 150 or 170 may be determined based on mirror angles $\theta_{MR\_H}$ and $\theta_{MR\_V}$ and the view angles $\theta_{VR\_H}$ and $\theta_{VR\_V}$ for the rear-view mirror 130, mirror angles $\theta_{MS\_H}$ and $\theta_{MS\_V}$ for the side-view mirror 150 or 170, and geometric relationships between the rear-view mirror 130 and the side-view mirror 150 or 170. For example, the geometric relationships between the rear-view mirror 130 and the right side-view mirror 170 may include a horizontal distance $D_{R\_X}$ along the x-axis, a horizontal distance $D_{R\_Y}$ along the y-axis, and a vertical distance $D_{R\_Z}$ along the z-axis between the center point 132 of the rear-view mirror 130 and the right endpoint 174 of the mirror plane of the right side-view mirror 170.

The adjustment angle determination unit 760 may determine whether to adjust the view mirrors 130, 150, and 170 by calculating a difference in the horizontal angles of the initial mirror and view angles in the horizontal plane, and a difference in the vertical angles of the initial mirror and view angles in the vertical plane. For example, if the difference between the horizontal mirror angle $\theta_{M\_H}$ and the horizontal view angle $\theta_{V\_H}$ for the rear-view mirror 130 exceeds a horizontal threshold angle from the view occlusion database 726, the adjustment angle determination unit 760 may determine that the rear-view mirror 130 is to be adjusted in the horizontal plane. On the other hand, if the difference between the vertical mirror angle $\theta_{M\_V}$ and the vertical view angle $\theta_{V\_V}$ for the rear-view mirror 130 exceeds a vertical threshold angle from the view occlusion database 726, the adjustment angle determination unit 760 may determine that the rear-view mirror 130 is to be adjusted in the vertical plane. If a driver's view of the rear window 300 in the rear-view mirror 130 is less than a percentage of the view associated with the horizontal and vertical threshold angles based on the view occlusion database 726, it may be determined that the rear-view mirror 130 is to be adjusted in both the horizontal and vertical planes. In a similar manner, the adjustment angle determination unit 760 may also determine whether to adjust the side-view mirror 150 or 170 based on the view occlusion database 726.

If it is determined that the view mirrors 130, 150, and 170 are to be adjusted, the adjustment angle determination unit 760 may determine adjustment angles for each of the view mirrors 130, 150, and 170 based on initial mirror angles and the calculated view angles in the horizontal and vertical planes. For example, the adjustment angle for the rear-view mirror 130 in the horizontal direction may be determined based on the initial mirror angle $\theta_{M\_H}$ and the view angle $\theta_{V\_H}$ as described above with reference to FIG. 3. Similarly, the adjustment angle determination unit 760 may determine the adjustment angle for the rear-view mirror 130 in the vertical direction based on the initial mirror angle $\theta_{M\_V}$ and the view angle $\theta_{V\_V}$ as described above with reference to FIG. 4.

Additionally, the adjustment angle determination unit 760 may determine the adjustment angles for the right side-view mirror 170 based on initial mirror angles of the right side-view mirror 170 in the horizontal and vertical planes, the calculated view angles, and the geometric relationship between the predetermined location 510 and the right side-view mirror 170. As described above with reference to FIG. 5, the predetermined location 510 may be selected to be any suitable location to represent a center point of a side view of the vehicle 100 and may be located on a side of the vehicle 100 or a position near the side of the vehicle 100. The adjustment angles for the left side-view mirror 150 may also be determined in a similar manner.

Once the adjustment angles for each of the view mirrors 130, 150, and 170 have been determined, the adjustment angles may be provided to the mirror control unit 770. Upon receiving the adjustment angles for the view mirrors 130, 150, and 170, the mirror control unit 770 may generate control signals for each of the view mirrors 130, 150, and 170 corresponding to the adjustment angles and transmit the control signals to the associated motor units 140, 160, and 180, respectively. In response to the control signals received from the mirror control unit 770 for adjusting the view mirrors 130, 150, and 170, the motor units 140, 160, and 180 may adjust the view mirrors 130, 150, and 170, respectively, in the horizontal and vertical directions.

After the view mirrors 130, 150, and 170 have been adjusted to respective adjustment angles, the adjustment angle determination unit 760 may determine new adjustment angles in the horizontal and vertical planes to refine the mirror angles of the view mirrors 130, 150, and 170. In one embodiment, the adjustment angle determination unit 760 may track a movement of the head 260 and a body of the driver 190 based on at least two images including the head 260, a neck, and/or shoulders of the driver 190. In this case, the object detection unit 750 may extract one or more features corresponding to the head 260, the neck, and/or one or more shoulders of the driver 190 from each of the at least two images taken at different times. Additionally, the object detection unit 750 may determine a position for each of the extracted features in the images.

The adjustment angle determination unit 760 may receive the extracted features and the associated positions for the features, and determine a change in position of each of the extracted features in the at least two images. For example, the positions of each of the features in the at least two images may be compared to determine a movement (e.g., a change in positions) of the feature including a distance of the movement. Further, the adjustment angle determination unit 760 may also determine a direction of the movement of the driver 190 based on the movement of the one or more features in the at least two images.

When the direction and distance of the movement of the driver 190 have been determined, the adjustment angle determination unit 760 may determine a pair of new mirror angles in the horizontal and vertical planes for each of the view mirrors 130, 150, and 170 based on the direction and distance of the movement of the driver 190. In this case, the direction of the movement may be used to determine whether to increase or reduce a mirror angle and the distance of the movement may be used to determine a specified mirror angle. Once a specified mirror angle and a direction for adjusting the mirror angle (e.g., reduce or increase) have been determined for the mirror angle of each of the view mirrors 130, 150, and 170, the adjustment angle determination unit 760 may determine an angle by which the view mirrors 130, 150, and 170 may be increased or reduced to arrive at the specified mirror angle.

In some embodiments, the movement of the driver 190 may result in a direction and distance in both the horizontal and vertical planes. In such cases, the mirror angles in both the horizontal and vertical planes may be determined. In one embodiment, when the movement of the driver 190 is determined to be a specified distance toward the left side of the driver 190 or the vehicle 100, the mirror angle in the horizontal plane for the rear-view mirror 130 or the right side-view mirror 170 may be reduced by a predetermined angle and the mirror angle in the horizontal plane for the left side-view mirror 150 may be increased by a predetermined angle. On the other hand, when the movement of the driver 190 is determined to be a specified distance toward the right side of the driver 190 or the vehicle 100, the mirror angle in the horizontal plane for the rear-view mirror 130 or the right side-view mirror 170 may be increased by a predetermined angle and the mirror angle in the horizontal plane for the left side-view mirror 150 may be reduced by a predetermined angle. Similarly, when the movement of the driver 190 is determined to be a specified distance toward the upper side of the driver 190 or the vehicle 100, the mirror angles in the vertical plane for the view mirrors 130, 150, and 170 may be increased by a predetermined angle. On the other hand, when the movement of the driver 190 is determined to be a specified distance toward the lower side of the driver 190 or the vehicle 100, the mirror angles in the vertical plane for the view mirrors 130, 150, and 170 may be reduced by a predetermined angle.

In some embodiments, the adjustment angle determination unit 760 may determine new mirror angles for each of the view mirrors 130, 150, and 170 based on an operation mode of the vehicle 100 such as a parking or reverse mode, traffic condition near the vehicle 100 (e.g., presence of vehicle traffic), and the like. In the case where the vehicle 100 is in a parking or reverse mode, the adjustment angles in the vertical plane for the left side-view mirror 150 or the right side-view mirror 170 may be increased to tilt the mirror plane of the side-view mirror 150 or 170 in a downward direction. Additionally, when the traffic condition near the vehicle 100 indicates a presence of vehicle traffic on one side of the vehicle 100, the adjustment angle determination unit 760 may determine the mirror angles of the side-view mirror 150 or 170 to provide a better view of vehicles on that side of the vehicle 100.

Figure 8:
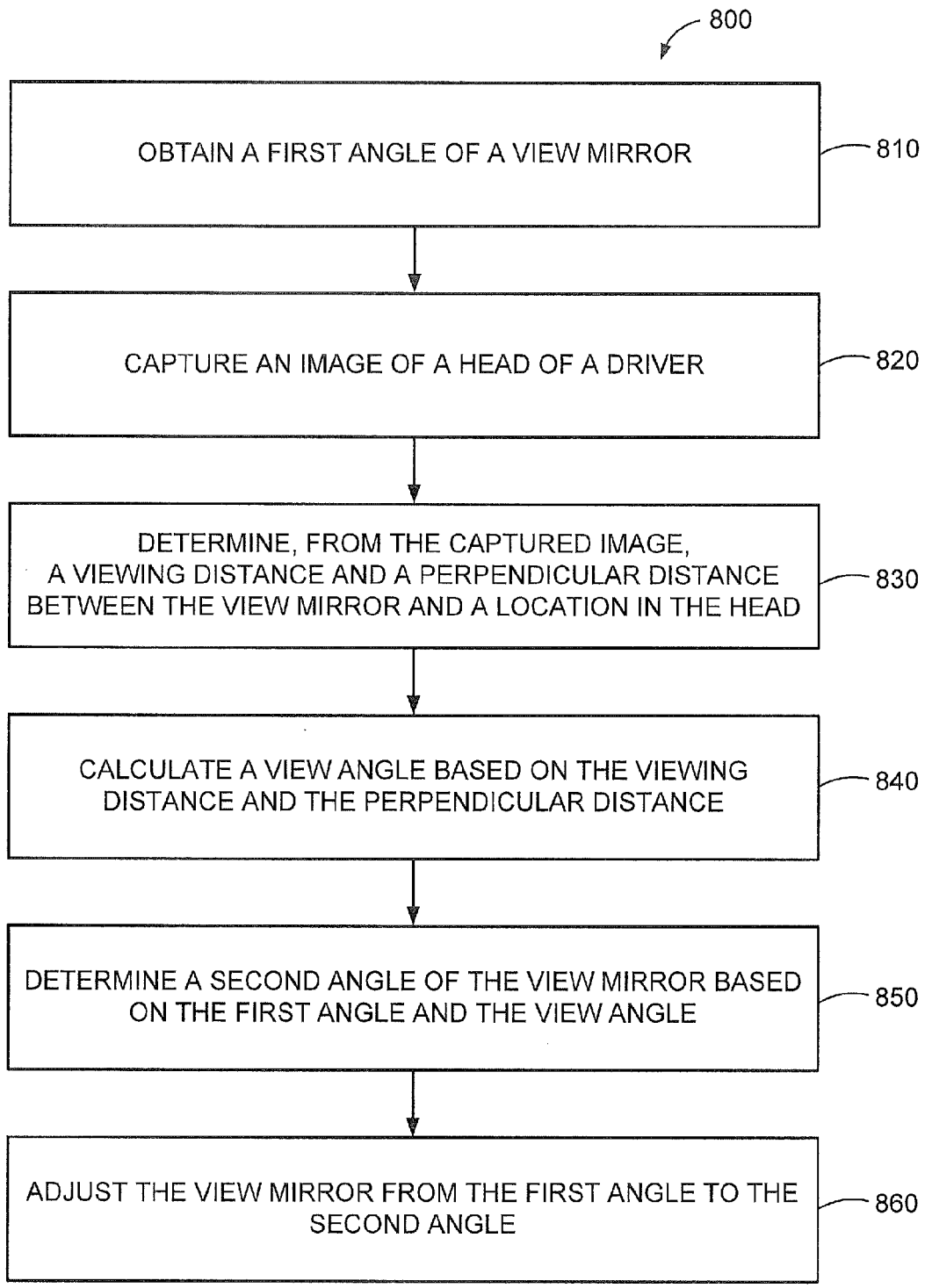
FIG. 8 is a flow chart of a method for adjusting a view mirror in a vehicle based on a captured image of a driver, according to one embodiment of the present disclosure.

FIG. 8 is a flow chart of a method 800, performed in the electronic device 110, for adjusting a view mirror in a vehicle based on a captured image of a driver, according to one embodiment of the present disclosure. Initially, the electronic device 110 may obtain a first angle of the view mirror, at 810. The electronic device may capture an image of a head of the driver, at 820. From the captured image, the electronic device 110 may determine a viewing distance and a perpendicular distance between the view mirror and a location in the head, at 830. Based on the viewing distance and the perpendicular distance, the electronic device 110 may calculate a view angle between a direction orthogonal to the view mirror and a view direction associated with the location in the head and the view mirror, at 840. Based on the first angle and the view angle, the electronic device 110 may determine a second angle of the view mirror in the reference plane, at 850. The electronic device 110 may adjust the view mirror from the first angle to the second angle, at 860.

Figure 9:
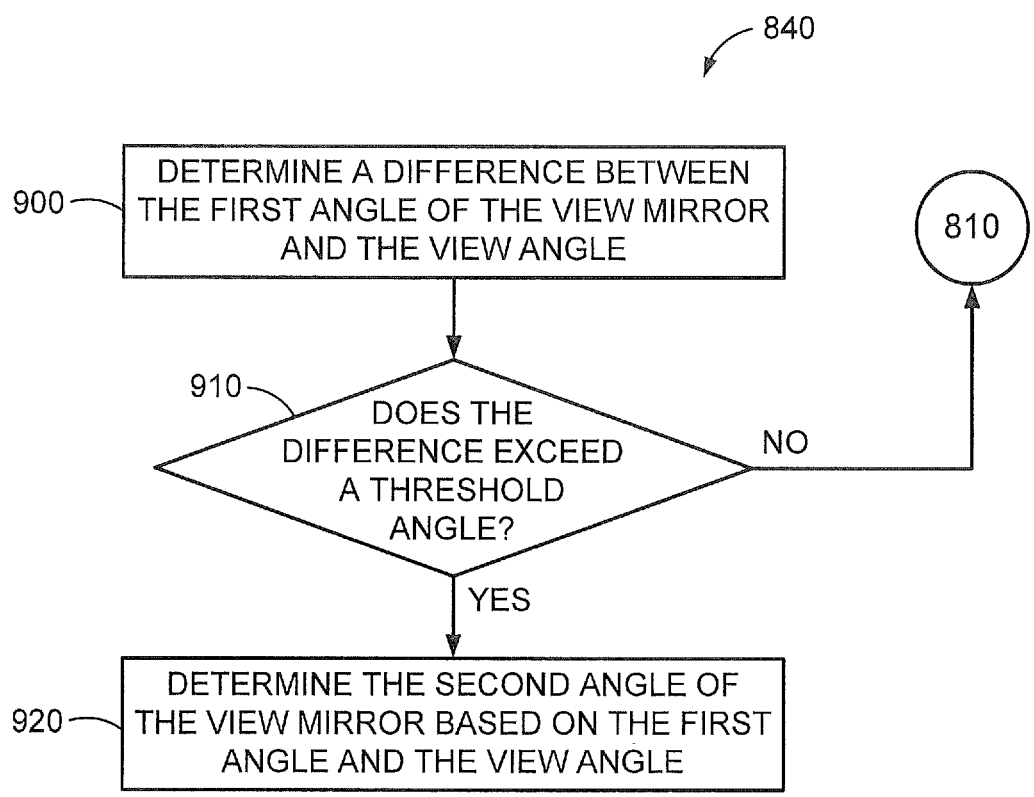
FIG. 9 is a flow chart of a method for determining whether to adjust a view mirror in a vehicle based on a threshold angle, according to one embodiment of the present disclosure.

FIG. 9 is a flow chart of a detailed method 840, performed in the electronic device 110, for determining whether to adjust a view mirror in a vehicle based on a threshold angle, according to one embodiment of the present disclosure. The electronic device 110 may determine a difference between the first angle of the view mirror and the view angle, at 900. The electronic device 110 may determine whether the difference exceeds a threshold angle, at 910. If the difference exceeds the threshold angle (i.e., YES at 910), the electronic device 110 may determine the second angle of the view mirror based on the first angle and the view angle, at 920. If the difference does not exceed the threshold angle (i.e., NO at 910), the method 840 proceeds to 810 for capturing an image of a head of a driver based on the first angle of the view mirror with respect to a reference direction in a reference plane.

Figure 10:
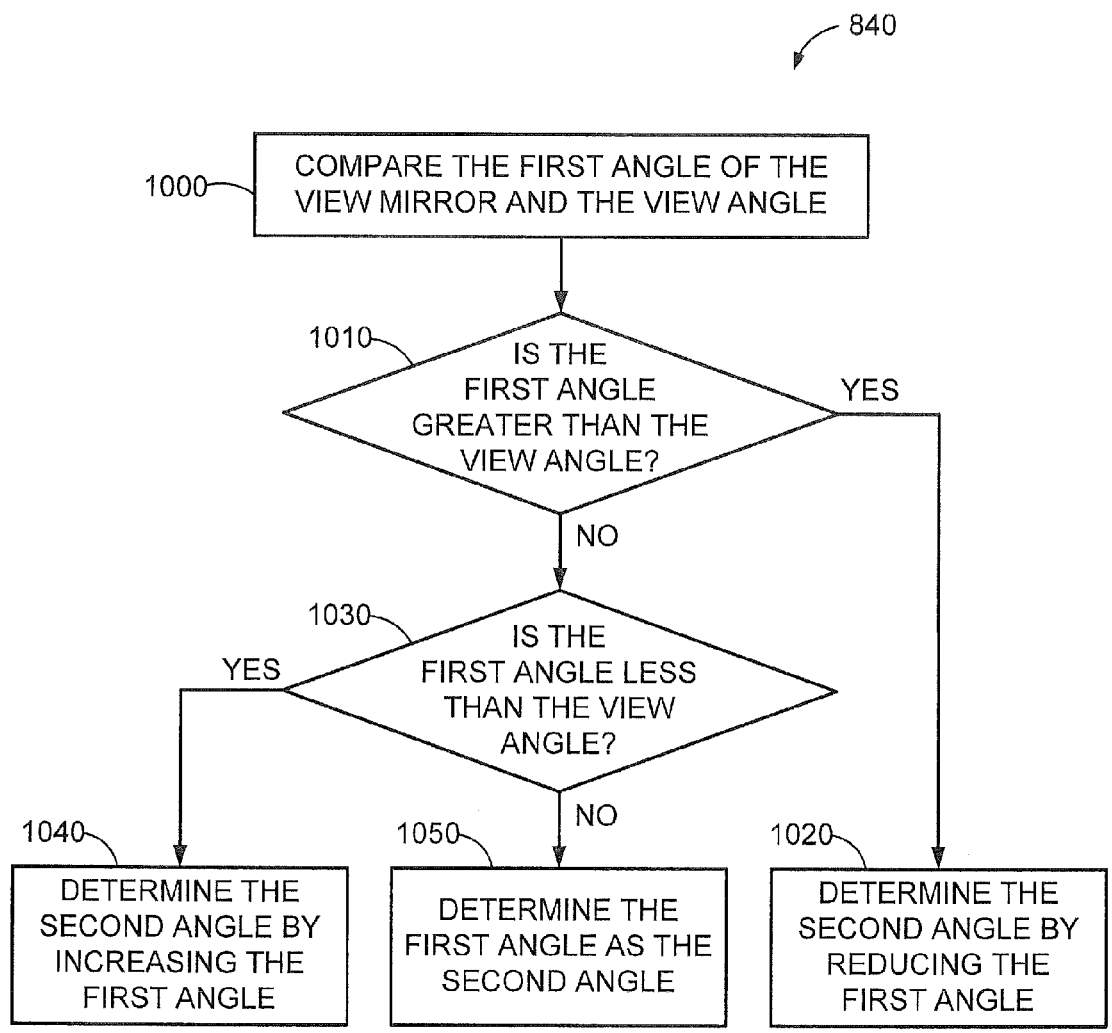
FIG. 10 is a flow chart of a method for determining an adjustment angle of a view mirror in a vehicle based on comparison of an angle of the view mirror and a view angle, according to one embodiment of the present disclosure.

FIG. 10 is a flow chart of a detailed method 840, performed in the electronic device 110, for determining an adjustment angle of a view mirror in a vehicle based on comparison of an angle of the view mirror and a view angle, according to one embodiment of the present disclosure. The electronic device 110 may compare the first angle of the view mirror and the view angle, at 1000. The electronic device 110 may determine whether the first angle is greater than the view angle, at 1010. If the first angle is greater than the view angle (i.e., YES at 1010), the electronic device 110 may determine the second angle by reducing the first angle, at 1020. If the first angle is not greater than the view angle (i.e., NO at 1010), the electronic device 110 may determine whether the first angle is less than the view angle, at 1030. If the first angle is less than the view angle (i.e., YES at 1030), the electronic device 110 may determine the second angle by increasing the first angle, at 1040. If the first angle is equal to the view angle (i.e., NO at 1030), the electronic device 110 may determine the first angle as the second angle, at 1050.

Figure 11:
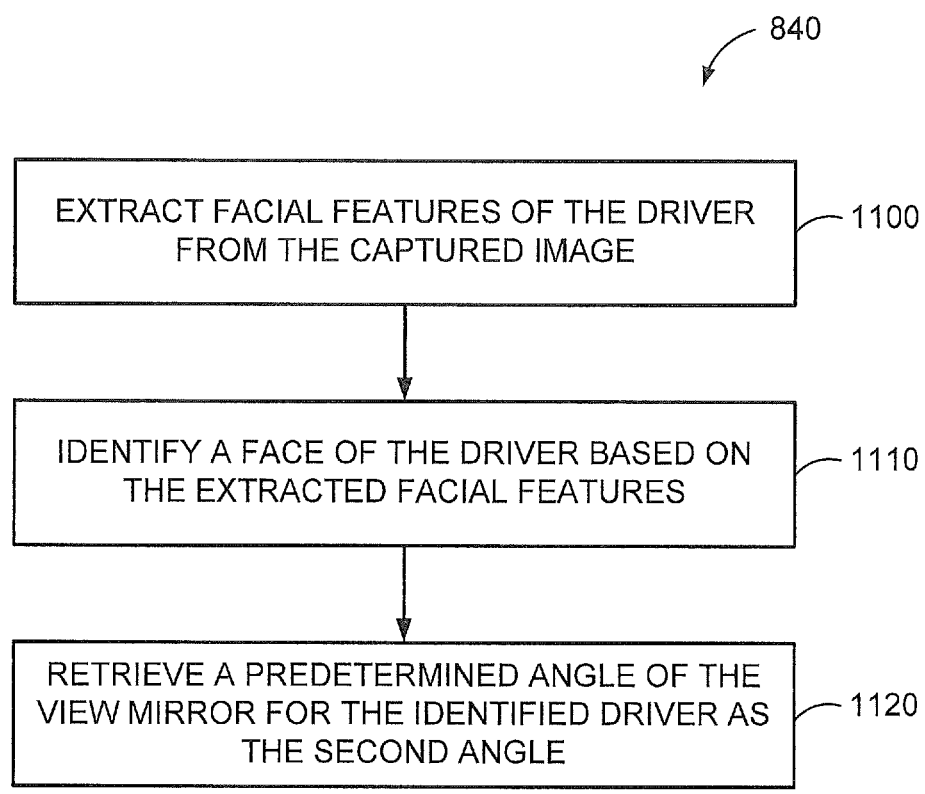
FIG. 11 is a flow chart of a method for determining an adjustment angle of a view mirror in a vehicle based on facial features of a driver, according to one embodiment of the present disclosure.

FIG. 11 is a flow chart of a detailed method 840, performed in the electronic device 110, for determining an adjustment angle of a view mirror in the vehicle 100 based on facial features of a driver, according to one embodiment of the present disclosure. The electronic device 110 may extract facial features of the driver from the captured image, at 1100. Based on the extracted facial features, the electronic device 110 may identify a face of the driver, at 1110. Then, the electronic device 110 may retrieve a predetermined angle of the view mirror for the identified driver as the second angle, at 1120.

Figure 12:
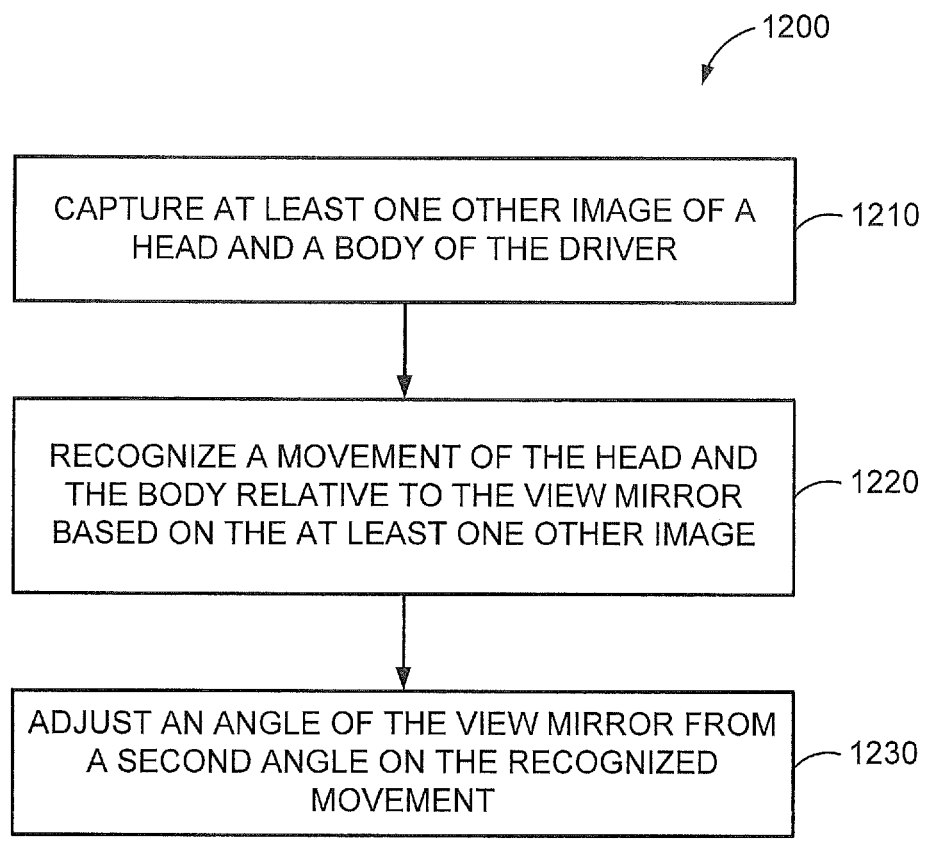
FIG. 12 is a flow chart of a method for determining an adjustment angle of a view mirror in a vehicle based on a captured image of a body and a head of a driver, according to one embodiment of the present disclosure.

FIG. 12 is a flow chart of a method 1200, performed in the electronic device 110, for determining an adjustment angle of a view mirror in the vehicle 100 based on a captured image of a body and a head of a driver, according to one embodiment of the present disclosure. The electronic device 110 may capture at least one other image of the head and the body of the driver, at 1210. The electronic device 110 may recognize a movement of the head and the body relative to the view mirror based on the at least one other image, at 1220. The electronic device 110 may adjust an angle of the view mirror from a second angle based on the recognized movement, at 1230.

Figure 13:
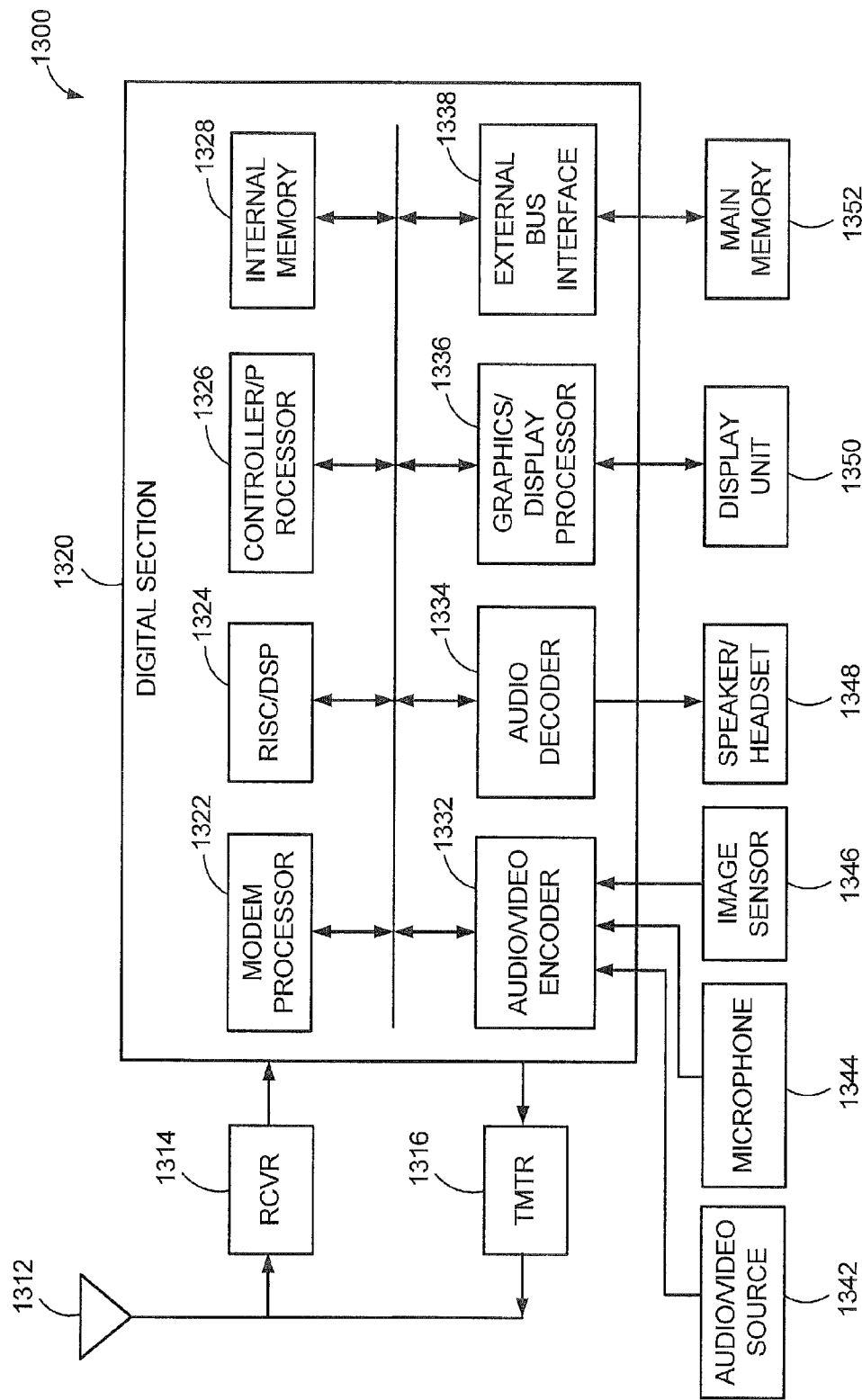
FIG. 13 is a block diagram of an exemplary electronic device in which the methods and apparatus for adjusting a view mirror in a vehicle may be implemented, according to some embodiments of the present disclosure.

FIG. 13 is a block diagram of an exemplary electronic device 1300 in which the methods and apparatus for adjusting a view mirror in a vehicle may be implemented according to some embodiments of the present disclosure. The configuration of the electronic device 1300 may be implemented in the electronic devices according to the above embodiments described with reference to FIGS. 1 to 12. The electronic device 1300 may be a cellular phone, a smartphone, a tablet computer, a laptop computer, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Term Evolution (LTE) system, LTE Advanced system, etc. Further, the electronic device 1300 may communicate directly with another mobile device, e.g., using Wi-Fi Direct or Bluetooth.

The electronic device 1300 is capable of providing bidirectional communication via a receive path and a transmit path. On the receive path, signals transmitted by base stations are received by an antenna 1312 and are provided to a receiver (RCVR) 1314. The receiver 1314 conditions and digitizes the received signal and provides samples such as the conditioned and digitized digital signal to a digital section for further processing. On the transmit path, a transmitter (TMTR) 1316 receives data to be transmitted from a digital section 1320, processes and conditions the data, and generates a modulated signal, which is transmitted via the antenna 1312 to the base stations. The receiver 1314 and the transmitter 1316 may be part of a transceiver that may support CDMA, GSM, LTE, LIE Advanced, etc.

The digital section 1320 includes various processing, interface, and memory units such as, for example, a modem processor 1322, a reduced instruction set computer/digital signal processor (RISC/DSP) 1324, a controller/processor 1326, an internal memory 1328, a generalized audio/video encoder 1332, a generalized audio decoder 1334, a graphics/display processor 1336, and an external bus interface (EBI) 1338. The modem processor 1322 may perform processing for data transmission and reception, e.g., encoding, modulation, demodulation, and decoding. The RISC/DSP 1324 may perform general and specialized processing for the electronic device 1300. The controller/processor 1326 may perform the operation of various processing and interface units within the digital section 1320. The internal memory 1328 may store data and/or instructions for various units within the digital section 1320.

The generalized audio/video encoder 1332 may perform encoding for input signals from an audio/video source 1342, a microphone 1344, an image sensor 1346, etc. The generalized audio decoder 1334 may perform decoding for coded audio data and may provide output signals to a speaker/headset 1348. The graphics/display processor 936 may perform processing for graphics, videos, images, and texts, which may be presented to a display unit 1350. The EBI 1338 may facilitate transfer of data between the digital section 1320 and a main memory 1352.

The digital section 1320 may be implemented with one or more processors, DSPs, microprocessors, RISCs, etc. The digital section 1320 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for adjusting a view mirror in a vehicle, comprising:
   obtaining a first angle of the view mirror;
   capturing an image of a head of a driver;
   determining, from the captured image, a viewing distance and a perpendicular distance between a location in the head and the view mirror;
   calculating a view angle based on the viewing distance and the perpendicular distance, wherein the view angle is an angle between a direction orthogonal to the view mirror and a view direction associated with the location in the head and the view mirror;
   determining a second angle of the view mirror based on the first angle and the view angle; and
   adjusting the view mirror from the first angle to the second angle.

2. The method of claim 1, wherein the first and second angles of the view mirror, the viewing and perpendicular distances, and the view angle are in a reference plane.

3. The method of claim 2, wherein the reference plane includes at least one of a first plane and a second plane orthogonal to the first plane.

4. The method of claim 1, wherein determining the second angle comprises:
   determining whether a difference between the first angle of the view mirror and the view angle exceeds a threshold angle; and
   determining the second angle in response to determining that the difference exceeds the threshold angle.

5. The method of claim 1, wherein determining the second angle comprises:
   determining whether the first angle is greater than the view angle; and
   determining the second angle by reducing the first angle in response to determining that the first angle is greater than the view angle.

6. The method of claim 1, wherein determining the second angle comprises:
   determining whether the first angle is less than the view angle; and
   determining the second angle by increasing the first angle in response to determining that the first angle is less than the view angle.

7. The method of claim 1, wherein determining the second angle comprises:
   determining whether the first angle is equal to the view angle; and
   determining the first angle as the second angle in response to determining that the first angle is equal to the view angle.

8. The method of claim 1, wherein determining the second angle comprises calculating an average of the first angle and the view angle.

9. The method of claim 1, wherein the location is a position of at least one eye.

10. The method of claim 1, wherein the view mirror is at least one of a rear-view mirror and at least one side-view mirror.

11. The method of claim 10, wherein the view mirror is the rear-view mirror, and further comprising:
    determining a third angle of a side-view mirror based on at least one of the first angle, the view angle, and a geometric arrangement of the rear-view mirror and the side-view mirror in the vehicle; and
    adjusting an angle of the side-view mirror to the third angle.

12. The method of claim 1, wherein determining the second angle comprises:
    extracting facial features of the driver from the captured image;
    identifying a face of the driver based on the extracted facial features; and
    retrieving a predetermined angle of the view mirror for the identified driver as the second angle.

13. The method of claim 1, further comprising:
    capturing at least one other image of the head and a body of the driver;
    recognizing a movement of the head and the body relative to the view mirror based on the at least one other image; and
    adjusting an angle of the view mirror from the second angle based on the recognized movement.

14. The method of claim 1, wherein determining the second angle comprises:
    detecting an operating mode of the vehicle; and
    determining the second angle of the view mirror according to the detected operating mode of the vehicle.

15. A method for adjusting a view mirror in a vehicle, comprising:
    obtaining a first angle of the view mirror;
    capturing an image of a head of a driver;
    determining, from the captured image, a perpendicular direction orthogonal to the view mirror and a view direction, wherein the view direction is associated with a location in the head and the view mirror;
    calculating a view angle based on the view direction and the perpendicular direction;
    determining a second angle of the view mirror based on the first angle and the view angle; and
    adjusting the view mirror from the first angle to the second angle.

16. The method of claim 15, wherein the first and second angles of the view mirror, the view and perpendicular directions, and the view angle are in a reference plane.

17. An electronic device in a vehicle for adjusting a view mirror in the vehicle, comprising:
    an image sensor unit configured to capture an image of a head of a driver;
    an object detection unit configured to determine, from the captured image, a viewing location in the head;
    an adjustment angle determination unit configured to obtain a first angle of the view mirror, determine, from the captured image, a viewing distance and a perpendicular distance between the view mirror and the viewing location, calculate a view angle based on the viewing distance and the perpendicular distance, and determine a second angle of the view mirror based on the first angle and the view angle, wherein the view angle is an angle between a direction orthogonal to the view mirror and a view direction associated with the viewing location and the view mirror; and
    a mirror control unit configured to adjust the view mirror from the first angle to the second angle.

18. The electronic device of claim 17, wherein the first and second angles of the view mirror, the viewing and perpendicular distances, and the view angle are in a reference plane.

19. The electronic device of claim 18, wherein the reference plane includes at least one of a first plane and a second plane orthogonal to the first plane.

20. The electronic device of claim 17, wherein the adjustment angle determination unit is further configured to:
    determine whether a difference between the first angle of the view mirror and the view angle exceeds a threshold angle; and
    determine the second angle in response to determining that the difference exceeds the threshold angle.

21. The electronic device of claim 17, wherein the adjustment angle determination unit is further configured to:
    determine whether the first angle is greater than the view angle; and
    determine the second angle by reducing the first angle in response to determining that the first angle is greater than the view angle.

22. The electronic device of claim 17, wherein the adjustment angle determination unit is further configured to:
    determine whether the first angle is less than the view angle; and
    determine the second angle by increasing the first angle in response to determining that the first angle is less than the view angle.

23. The electronic device of claim 17, wherein the adjustment angle determination unit is further configured to:
    determine whether the first angle is equal to the view angle; and
    determine the first angle as the second angle in response to determining that the first angle is equal to the view angle.

24. The electronic device of claim 17, wherein the adjustment angle determination unit is further configured to calculate an average of the first angle and the view angle.

25. The electronic device of claim 17, wherein the view mirror is at least one of a rear-view mirror and at least one side-view mirror.

26. The electronic device of claim 25, wherein the view mirror is the rear-view mirror,
    wherein the adjustment angle determination unit is further configured to determine a third angle of a side-view mirror based on at least one of the first angle, the view angle, and a geometric arrangement of the rear-view mirror and the side-view mirror in the vehicle, and wherein the mirror control unit is further configured to adjust an angle of the side-view mirror to the third angle.

27. The electronic device of claim 17, further comprising a face recognition unit configured to:
    extract facial features of the driver from the captured image;
    identify a face of the driver based on the extracted facial features; and
    retrieve a predetermined angle of the view mirror for the identified driver as the second angle.

28. The electronic device of claim 17, wherein the image sensor unit is further configured to capture at least one other image of the head and a body of the driver,
    wherein the adjustment angle determination unit is further configured to recognize a movement of the head and the body relative to the view mirror based on the at least one other image, and
    wherein the mirror control unit is further configured to adjust the view mirror from the second angle based on the recognized movement.

29. A non-transitory computer-readable storage medium storing instructions for adjusting a view mirror in a vehicle in an electronic device, the instructions causing a processor to perform operations of:
    obtaining a first angle of the view mirror;
    capturing an image of a head of a driver;
    determining, from the captured image, a viewing distance and a perpendicular distance between a location in the head and the view mirror;
    calculating a view angle based on the viewing distance and the perpendicular distance, wherein the view angle is an angle between a direction orthogonal to the view mirror and a view direction associated with the location in the head and the view mirror;
    determining a second angle of the view mirror based on the first angle and the view angle; and
    adjusting the view mirror from the first angle to the second angle.

30. The medium of claim 29, wherein the first and second angles of the view mirror, the viewing and perpendicular distances, and the view angle are in a reference plane.

* * * * *